US008295591B2

(12) United States Patent
Cobb et al.

(10) Patent No.: US 8,295,591 B2
(45) Date of Patent: Oct. 23, 2012

(54) ADAPTIVE VOTING EXPERTS FOR INCREMENTAL SEGMENTATION OF SEQUENCES WITH PREDICTION IN A VIDEO SURVEILLANCE SYSTEM

(75) Inventors: Wesley Kenneth Cobb, The Woodlands, TX (US); Bobby Ernest Blythe, Houston, TX (US); David Samuel Friedlander, Houston, TX (US); Kishor Adinath Saitwal, Houston, TX (US); Gang Xu, Katy, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 574 days.

(21) Appl. No.: 12/543,379

(22) Filed: Aug. 18, 2009

(65) Prior Publication Data

US 2011/0044492 A1    Feb. 24, 2011

(51) Int. Cl.
    *G06K 9/00*    (2006.01)
(52) U.S. Cl. ........................................ 382/155
(58) Field of Classification Search ........................ None
    See application file for complete search history.

(56) References Cited

U.S. PATENT DOCUMENTS

| | | |
|---|---|---|
| 4,679,077 A | 7/1987 | Yuasa et al. |
| 5,113,507 A | 5/1992 | Jaeckel |
| 5,748,775 A | 5/1998 | Tsuchikawa et al. |
| 5,751,378 A | 5/1998 | Chen et al. |
| 5,969,755 A | 10/1999 | Courtney |
| 6,252,974 B1 | 6/2001 | Martens et al. |
| 6,263,088 B1 | 7/2001 | Crabtree et al. |
| 6,570,608 B1 | 5/2003 | Tserng |
| 6,661,918 B1 | 12/2003 | Gordon et al. |
| 6,674,877 B1 | 1/2004 | Jojic et al. |
| 6,678,413 B1 | 1/2004 | Liang et al. |
| 6,856,249 B2 | 2/2005 | Strubbe et al. |
| 6,940,998 B2 | 9/2005 | Garoutte |
| 7,076,102 B2 | 7/2006 | Lin et al. |
| 7,136,525 B1 | 11/2006 | Toyama et al. |
| 7,158,680 B2 | 1/2007 | Pace |
| 7,200,266 B2 | 4/2007 | Ozer et al. |

(Continued)

FOREIGN PATENT DOCUMENTS

EP    1927947 A1    6/2008

(Continued)

OTHER PUBLICATIONS

J. Connell et al., "Detection and Tracking in the IBM PeopleVision System," IEEE ICME, Jun. 2004: pp. 1-4, <http://www.research.ibm.com/peoplevision>.

(Continued)

*Primary Examiner* — Vikkram Bali
(74) *Attorney, Agent, or Firm* — Patterson & Sheridan LLP

(57) ABSTRACT

A sequence layer in a machine-learning engine configured to learn from the observations of a computer vision engine. In one embodiment, the machine-learning engine uses the voting experts to segment adaptive resonance theory (ART) network label sequences for different objects observed in a scene. The sequence layer may be configured to observe the ART label sequences and incrementally build, update, and trim, and reorganize an ngram trie for those label sequences. The sequence layer computes the entropies for the nodes in the ngram trie and determines a sliding window length and vote count parameters. Once determined, the sequence layer may segment newly observed sequences to estimate the primitive events observed in the scene as well as issue alerts for inter-sequence and intra-sequence anomalies.

25 Claims, 13 Drawing Sheets

U.S. PATENT DOCUMENTS

| | | | |
|---|---|---|---|
| 7,227,893 B1 | 6/2007 | Srinivasa et al. | |
| 7,436,887 B2 | 10/2008 | Yeredor et al. | |
| 7,587,064 B2 * | 9/2009 | Owechko et al. | 382/103 |
| 7,825,954 B2 | 11/2010 | Zhang et al. | |
| 7,868,912 B2 | 1/2011 | Venetianer et al. | |
| 8,121,968 B2 * | 2/2012 | Eaton et al. | 706/46 |
| 2003/0107650 A1 | 6/2003 | Colmenarez et al. | |
| 2004/0151342 A1 | 8/2004 | Venetianer et al. | |
| 2005/0001759 A1 | 1/2005 | Khosla | |
| 2005/0104964 A1 | 5/2005 | Bovyrin et al. | |
| 2005/0105765 A1 | 5/2005 | Han et al. | |
| 2005/0240629 A1 | 10/2005 | Gu et al. | |
| 2006/0018516 A1 | 1/2006 | Masoud et al. | |
| 2006/0165386 A1 | 7/2006 | Garoutte | |
| 2006/0182339 A1 | 8/2006 | Connell | |
| 2006/0190419 A1 | 8/2006 | Bunn et al. | |
| 2006/0222206 A1 | 10/2006 | Garoutte | |
| 2008/0002856 A1 | 1/2008 | Ma et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0148068 A1 * | 6/2009 | Woodbeck | 382/305 |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |

FOREIGN PATENT DOCUMENTS

| | | | |
|---|---|---|---|
| WO | 2009049314 A2 | 4/2009 | |

OTHER PUBLICATIONS

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

International Search Report and Written Opinion of Patent Cooperation Treaty Application Serial No. PCT/US2010/045222 (BRS/0032PCT) dated May 25, 2011.

International Search Report and Written Opinion of Patent Cooperation Treaty Application Serial No. PCT/US2010/045218 dated Apr. 11, 2011.

Helmut Grabner et al., "On-line Boosting and Vision," IEEE Conference on Computer Vision and Pattern Recognition (CVPR), Jun. 2006, vol. 1: pp. 260-267.

Chris Stauffer et al., "Adaptive background mixture models for real-time tracking," Proceedings IEEE Conference on Computer Vision and Pattern Recognition, Jun. 1999: pp. 246-252.

Pentti Kanerva "Sparse Distributed memory and Related Models," M.H. Hassoun, ed., Associative Neural Memories: Theory and Implementation, Aug. 1993, pp. 50-76. New York: Oxford University Press.

Senior et al. "Appearance Models for Occlusion Handling," IBM T.J. Watson Research Center, Dec. 2001, 8 pages, Yorktown, Heights, NY US.

* cited by examiner

ADAPTIVE VOTING EXPERTS FOR INCREMENTAL SEGMENTATION OF SEQUENCES WITH PREDICTION IN A VIDEO SURVEILLANCE SYSTEM

BACKGROUND OF THE INVENTION

1. Field of the Invention

Embodiments of the invention provide techniques for analyzing a sequence of video frames. More specifically, embodiments of the invention relate to techniques for observing and identifying anomalous behavior in a sequence of video frames using adaptive voting experts.

2. Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera. Further, such systems may be configured to determine when an object has engaged in certain predefined behaviors. For example, the system may include definitions used to recognize the occurrence of a number of pre-defined events, e.g., the system may evaluate the appearance of an object classified as depicting a car (a vehicle-appear event) coming to a stop over a number of frames (a vehicle-stop event). Thereafter, a new foreground object may appear and be classified as a person (a person-appear event) and the person then walks out of frame (a person-disappear event). Further, the system may be able to recognize the combination of the first two events as a "parking-event."

However, such surveillance systems typically require that the objects and/or behaviors which may be recognized by the system to be defined in advance. Thus, in practice, these systems rely on predefined definitions for objects and/or behaviors to evaluate a video sequence. In other words, unless the underlying system includes a description for a particular object or behavior, the system is generally incapable of recognizing that behavior (or at least instances of the pattern describing the particular object or behavior). Thus, what is "normal" or "anomalous" is defined in advance and separate software products are required to recognize additional objects or behaviors. This results in video surveillance systems with recognition capabilities that are labor intensive and prohibitively costly to maintain or adapt for different specialized applications. Accordingly, currently available video surveillance systems are typically unable to recognize new patterns of behavior that may emerge in a given scene or recognize changes in existing patterns. More generally, such systems are often unable to identify objects, events, behaviors, or patterns (or classify such objects, events, behaviors, etc., as being normal or anomalous) by observing what happens in the scene over time; instead, such systems rely on static patterns defined in advance.

SUMMARY OF THE INVENTION

Embodiments of the invention relate to techniques for analyzing a scene captured by a video camera or other recorded video. One embodiment provides a computer-implemented method for analyzing a scene depicted in an input stream of video frames captured by a video camera. The method may generally include receiving a plurality of sequences. Each sequence stores an ordered string of labels assigned to clusters in an adaptive resonance theory (ART) network. Further, the ART network clusters nodes of a self-organizing map (SOM) generated by mapping, to nodes of the SOM, kinematic data vectors generated for foreground objects detected in the input stream of video frames. The method may also include generating, from the plurality sequences, an ngram trie to a specified depth, wherein the ngram trie includes a node for each subsequence present in the plurality of sequences, up to the specified depth. The method may also include determining, for each node in the ngram trie, an entropy measure based on a count of how many times the subsequence represented by the node appears in the plurality of sequences, receiving a first sequence, and determining, in the first sequence, one or more segments, based on the determined entropies.

Another embodiment of the invention includes a computer-readable storage medium containing a program, which when executed on a processor, performs an operation for analyzing a scene depicted in an input stream of video frames captured by a video camera. The operation itself may generally include receiving a plurality of sequences. Each sequence stores an ordered string of labels assigned to clusters in an adaptive resonance theory (ART) network. Further, the ART network clusters nodes of a self-organizing map (SOM) generated by mapping, to nodes of the SOM, kinematic data vectors generated for foreground objects detected in the input stream of video frames. The method may also include generating, from the plurality sequences, an ngram trie to a specified depth, wherein the ngram trie includes a node for each subsequence present in the plurality of sequences, up to the specified depth. The method may also include determining, for each node in the ngram trie, an entropy measure based on a count of how many times the subsequence represented by the node appears in the plurality of sequences, receiving a first sequence, and determining, in the first sequence, one or more segments, based on the determined entropies.

Still another embodiment of the invention includes a system. The system may generally include a video input source configured to provide an input stream of video frames captured by a video camera, each depicting a scene, a processor; and a memory containing a program, which, when executed on the processor is configured to perform an operation for analyzing the scene depicted in the input stream of video frames. The operation itself may generally include receiving a plurality of sequences. Each sequence stores an ordered string of labels assigned to clusters in an adaptive resonance theory (ART) network. Further, the ART network clusters nodes of a self-organizing map (SOM) generated by mapping, to nodes of the SOM, kinematic data vectors generated for foreground objects detected in the input stream of video frames. The method may also include generating, from the plurality sequences, an ngram trie to a specified depth, wherein the ngram trie includes a node for each subsequence present in the plurality of sequences, up to the specified depth. The method may also include determining, for each node in the ngram trie, an entropy measure based on a count of how many times the subsequence represented by the node appears in the plurality of sequences, receiving a first sequence, and determining, in the first sequence, one or more segments, based on the determined entropies.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
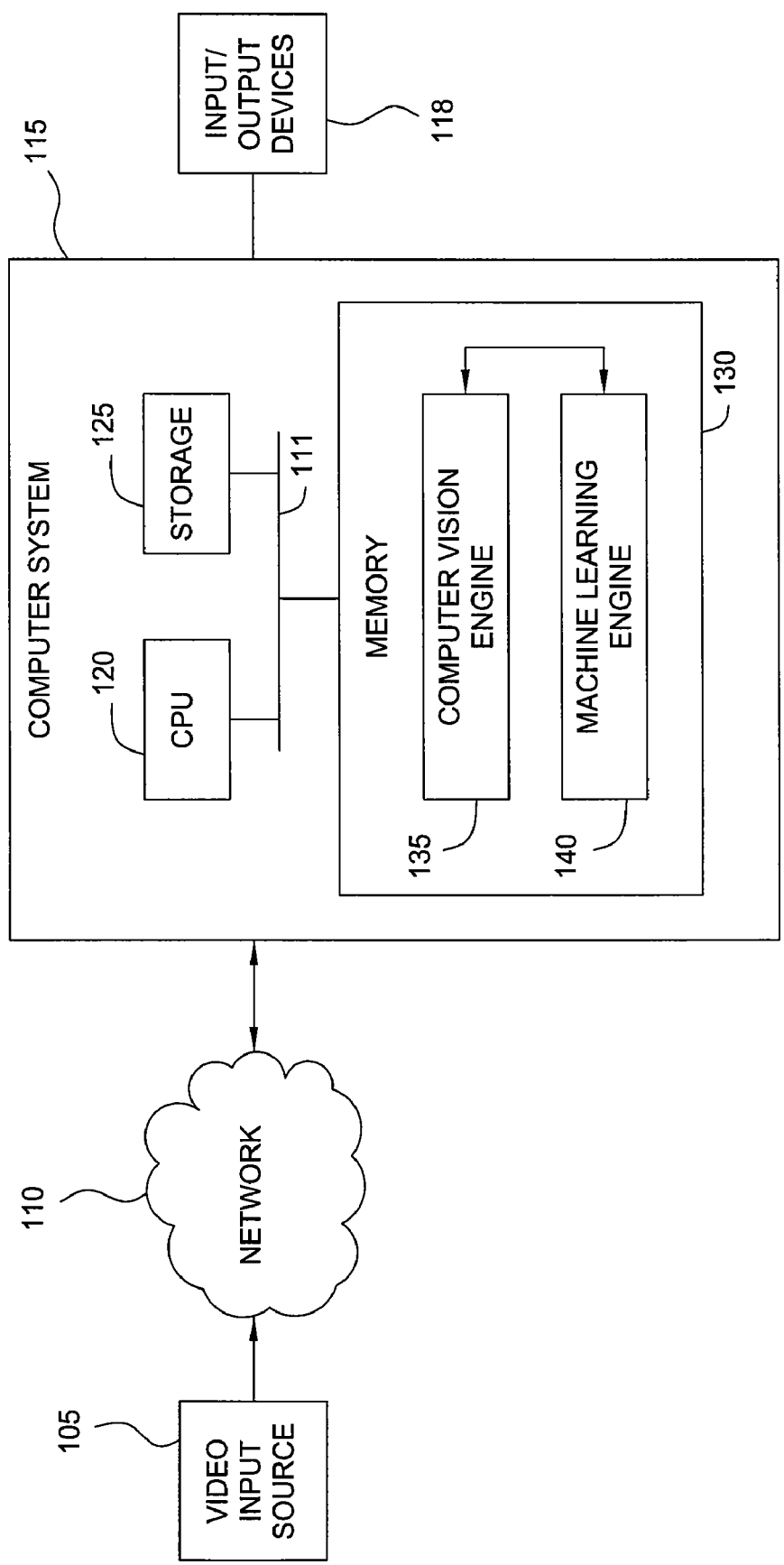
FIG. 1 illustrates components of a video analysis system, according to one embodiment of the invention.

Embodiments of the invention provide techniques for identifying and evaluating segments within sequences of events observed by a video surveillance system, as well as predictive abilities for feedback to components of the system used to generate the sequence. As used herein, a sequence generally provides a string of labels assigned to data generated by a video surveillance system while observing objects acting within a scene. And a segment generally refers to a sub-string of elements in the sequence, as identified by the video surveillance system. For example, a sequence could correspond to labels assigned to a foreground object depicting a person walking across a street over a number of video frames. In such a case, one segment could include the labels corresponding to the person approaching a crosswalk and another segment could include the labels corresponding to the person crossing the street. Thereafter, another segment could begin which includes the labels assigned to the sequence after the person has crossed the street.

Thus, as an object of a given type (e.g., a person) is identified in the frames of video, the behavior of the object is evaluated and assigned labels—resulting in a sequence of labels representing the behavior of the object. Different instances of the same object type engaging in similar behavior are assigned a similar sequence of labels. Segments are identified in the sequences, which correspond to related units of behavior, i.e., the segments represent primitive events from which larger patterns of behavior may be identified. However, the segments identified in the sequence of labels are not defined in advance, but are instead derived from the order in which labels are assigned to a sequence directly. That is, the segments are not identified by simply comparing the sequence to pre-defined definitions. This approach allows the system to learn what segments are relevant for a particular scene, based on observations of that scene, as well as allows the system to identify anomalous segments and sequences.

In one embodiment, an adaptive voting experts approach is used for incremental segmentation of sequences with prediction. As described in greater detail below, the voting experts approach provides an unsupervised induction-learning technique used for segmenting sequences into segments. In particular, the voting experts approach computes statistical signatures of different-length segments in a set of sequences and identifies the most probable segments in the sequences, based on the statistical signatures. The voting experts identify segments having low internal entropies (a measure of randomness), while also maximizing entropies at boundaries between segments.

Further, the video surveillance system may be configured to identity anomalous segments. More specifically, the video surveillance system uses inductive reasoning to identify general patterns of behavior (as represented by the observed sequence labels) to estimate a probability density function for different activities (representing the statistical likelihood of a given segment being observed). Doing so allows the video surveillance system to generate an alert when an observed intra-trajectory segment does not satisfy the estimated normal-activity statistics. Similarly, the video surveillance system may also generate alerts for inter-trajectory observations that do not satisfy the estimated normal-activity statistics for interactions between the sequences of different objects.

In one embodiment, the video surveillance system generates a background model representing the background elements of a scene. The background model generally represents the static elements of a scene captured by a video camera. For example, consider a video camera trained on a stretch of highway. In such a case, the background would include the roadway surface, the medians, any guard rails or other safety devices, and traffic control devices, etc., visible to the camera. The background model may include an expected pixel color value for each pixel of the scene when the background is visible to the camera. Thus, the background model provides an image of the scene in which no activity is occurring (e.g., an empty roadway). Conversely, vehicles traveling on the roadway (and any other person or thing engaging in some activity) occlude the background when visible to the camera and represent scene foreground objects.

Once the background model has matured, the computer vision engine may compare the pixel values for subsequent frames with the background image and identify objects as they appear and move about the scene. Typically, when a region of pixels in the scene (referred to as a "blob" or "patch") is classified as depicting foreground, the patch itself is identified as a foreground object. Further, the computer vision engine may identify features (e.g., height/width in pixels, average color values, shape, area, and the like) used to track the object from frame-to-frame.

Further still, the computer vision engine may derive a variety of information while tracking the object from frame-to-frame, e.g., position, current (and projected) trajectory, direction, orientation, velocity, acceleration, size, color shininess, rigidity, and the like. In one embodiment, the computer vision outputs this information as a stream of "context events" describing both a collection of kinematic information (e.g., the position, direction, and velocity, etc.) related to each foreground object detected in the video frames along with a number of micro-features of each object (e.g., the shininess, rigidity, area, and any other features which may be derived from the pixel values depicting an object). In one embodiment, the computer vision outputs the context events and micro-feature data related to each object actively being observed in the scene at a fixed rate (e.g., 5 Hz).

As described in greater detail herein, data output from the computer vision engine may be supplied to the machine-learning engine. In one embodiment, the machine-learning engine may include a cluster layer configured to evaluate the context events and to assign a label to distinct behavior engaged in by an object (based on the context event data), and a sequence layer configured to evaluate the sequence of labels assigned to multiple objects of a given type. Additionally, as events occur (and re-occur) the machine-learning engine may create, encode, store, retrieve, and reinforce patterns representing the events observed to have occurred, e.g., a long-term memory encoding a pattern generated from multiple observations of a car parking in the scene. The encoded patterns may be generated from the primitive events underlying the higher-level abstraction (e.g., from the segments of sequences generated by the voting experts). Further still, patterns representing an event of interest may result in alerts passed to users of the behavioral recognition system.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine-learning engine 140. As described in greater detail below, the computer vision engine 135 and the machine-learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

As noted above, the computer vision engine 135 may be configured to analyze this raw information to identify active objects in the video stream, classify the objects, derive a variety of metadata regarding the actions and interactions of such objects, and supply this information to a machine-learning engine 140. And in turn, the machine-learning engine 140 may be configured to evaluate, observe, learn and remember details regarding events (and types of events) that transpire within the scene over time.

In one embodiment, the machine-learning engine 140 receives the video frames and the data generated by the computer vision engine 135. The machine-learning engine 140 may be configured to analyze the received data, build semantic representations of events depicted in the video frames, detect patterns, and, ultimately, to learn from these observed patterns to identify normal and/or abnormal events. Additionally, data describing whether a normal/abnormal behavior/event has been determined and/or what such behavior/event is may be provided to output devices 118 to issue alerts, for example, an alert message presented on a GUI interface screen. In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 analyzes each frame in real-time to derive a set of information about what is occurring within a given frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application 250 running on another computer system may request (or receive) the results of over network 110.

Figure 2:
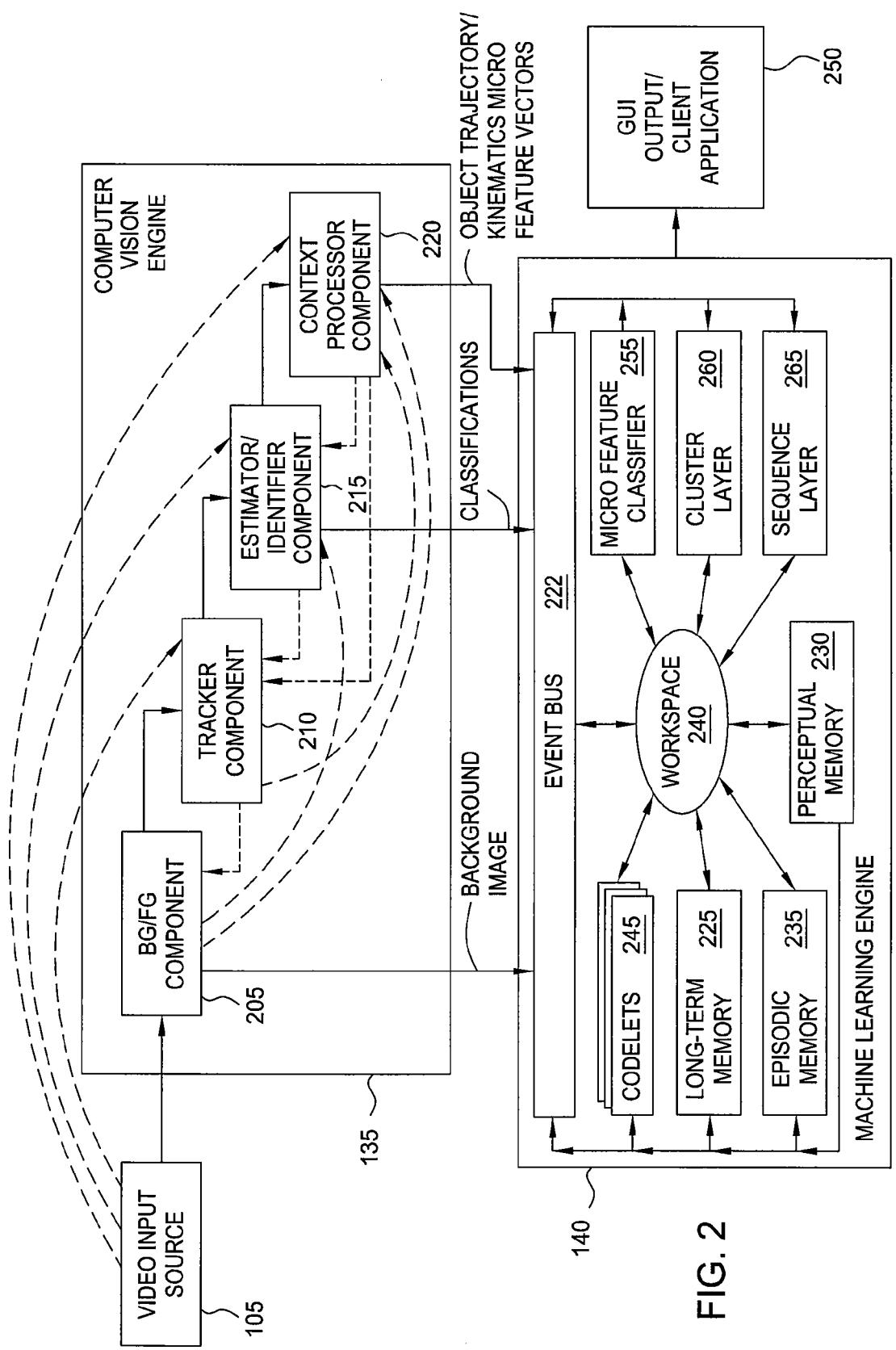
FIG. 2 further illustrates components of the video analysis system shown in FIG. 1, according to one embodiment of the invention.

FIG. 2 further illustrates components of the computer vision engine 135 and the machine-learning engine 140 first illustrated in FIG. 1, according to one embodiment of the invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case and further that additional components may be added (or some may be removed) from a video surveillance system.

In one embodiment, the BG/FG component 205 may be configured to separate each frame of video provided by the video input source 105 into a stationary or static part (the scene background) and a collection of volatile parts (the scene foreground.) The frame itself may include a two-dimensional array of pixel values for multiple channels (e.g., RGB channels for color video or grayscale channel or radiance channel for black and white video). In one embodiment, the BG/FG component 205 may model background states for each pixel using an adaptive resonance theory (ART) network. That is, each pixel may be classified as depicting scene foreground or scene background using an ART network modeling a given pixel. Of course, other approaches to distinguish between scene foreground and background may be used.

Additionally, the BG/FG component 205 may be configured to generate a mask used to identify which pixels of the scene are classified as depicting foreground and, conversely, which pixels are classified as depicting scene background. The BG/FG component 205 then identifies regions of the scene that contain a portion of scene foreground (referred to as a foreground "blob" or "patch") and supplies this information to subsequent stages of the pipeline. Additionally, pixels classified as depicting scene background maybe used to generate a background image modeling the scene.

The tracker component 210 may receive the foreground patches produced by the BG/FG component 205 and generate computational models for the patches. The tracker component 210 may be configured to use this information, and each successive frame of raw-video, to attempt to track the motion of an object depicted by a given foreground patch as it moves about the scene. That is, the tracker component 210 provides continuity to other elements of the system by tracking a given object from frame-to-frame.

The estimator/identifier component 215 may receive the output of the tracker component 210 (and the BF/FG component 205) and classify each tracked object as being one of a known category of objects. For example, in one embodiment, the estimator/identifier component 215 may classify a tracked object as being a "person," a "vehicle," an "unknown," or an "other." In this context, the classification of "other" represents an affirmative assertion that the object is neither a "person" nor a "vehicle." Alternatively, the estimator/identifier component 215 may derive a variety of micro features characterizing different aspects of a foreground object, e.g., size, height, width, and area (in pixels), reflectivity, shininess rigidity, speed velocity, etc.

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects tracked (by tracker component 210) and evaluated (by estimator identifier component 215). For example, the context processor component 220 may package a stream of micro feature vectors and kinematic observations of an object and output this to the machine-learning engine 140, e.g., a rate of 5 Hz. In one embodiment, the context events are packaged as a trajectory. As used herein, a trajectory generally refers to a vector packaging the kinematic data of a particular foreground object in successive frames or samples. Each element in the trajectory represents the kinematic data captured for that object at a particular point in time. Typically, a complete trajectory includes the kinematic data obtained when an object is first observed in a frame of video along with each successive observation of that object up to when it leaves the scene (or becomes stationary to the point of dissolving into the frame background). Accordingly, assuming computer vision engine 135 is operating at a rate of 5 Hz, a trajectory for an object is updated every 200 milliseconds, until complete.

The computer vision engine 135 may take the output from the components 205, 210, 215, and 220 describing the motions and actions of the tracked objects in the scene and supply this information to the machine-learning engine 140. Illustratively, the machine-learning engine 140 includes a long-term memory 225, a perceptual memory 230, an episodic memory 235, a workspace 240, codelets 245, a micro feature classifier 255, a cluster layer 260 and a sequence layer 265. Additionally, the machine-learning engine 140 includes a client application 250, allowing the user to interact with the video surveillance system 100 using a graphical user interface. Further still, the machine-learning engine 140 includes an event bus 222. In one embodiment, the components of the computer vision engine 135 and machine-learning engine 140 output data to the event bus 222. At the same time, the components of the machine-learning engine 140 may also subscribe to receive different events streams from the event bus 222. For example, the micro feature classifier 255 may subscribe to receive the micro feature vectors output from the computer vision engine 135.

Generally, the workspace 240 provides a computational engine for the machine-learning engine 140. For example, the workspace 240 may be configured to copy information from the perceptual memory 230, retrieve relevant memories from the episodic memory 235 and the long-term memory 225, select which codelets 245 to execute. In one embodiment, each codelet 245 is a software program configured to evaluate different sequences of events and to determine how one sequence may follow (or otherwise relate to) another (e.g., a finite state machine). More generally, the codelet may provide a software module configured to detect interesting patterns from the streams of data fed to the machine-learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine-learning engine 140 performs a cognitive cycle used to observe, and learn, about patterns of behavior that occur within the scene.

In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream). The episodic memory 235 stores data representing observed events with details related to a particular episode, e.g., information describing time and space details related on an event. That is, the episodic memory 235 may encode specific details of a particular event, i.e., "what and where" something occurred within a scene, such as a particular vehicle (car A) moved to a location believed to be a parking space (parking space 5) at 9:43 AM.

In contrast, the long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as an ART network and a sparse-distributed memory data structure.

The micro feature classifier 255 may schedule a codelet 245 to evaluate the micro feature vectors output by the computer vision engine 135. As noted, the computer vision engine 135 may track objects frame-to-frame and generate micro feature vectors for each foreground object at a rate of, e.g., 5 Hz. In one embodiment, the micro feature classifier 255 may be configured to create clusters from this stream of micro feature vectors. For example, each micro feature vector may be supplied to an input layer of the ART network (or a combination of a self organizing map (SOM) and ART network used to cluster nodes in the SOM). In response, the ART network maps the micro feature vector to a cluster in the ART network and updates that cluster (or creates a new cluster of the input micro feature vector is sufficiently dissimilar to the existing clusters). Each cluster is presumed to represent a distinct object type, and objects sharing similar micro feature vectors (as determined using the choice and vigilance parameters of the ART network) may map to the same cluster.

For example, the micro features associated with observations of many different vehicles may be similar enough to map to the same cluster (or group of clusters). At the same time, observations of many different people may map to a different cluster (or group of clusters). Thus, each distinct cluster in the art network generally represents a distinct type of object acting within the scene. And as new objects enter the scene, new object types may emerge in the ART network.

Importantly, however, this approach does not require the different object type classifications to be defined in advance; instead, object types emerge over time as distinct clusters in the ART network. In one embodiment, the micro feature classifier 255 may assign an object type identifier to each cluster, providing a different object type for each cluster in the ART network.

In an alternative embodiment, rather than generate clusters from the micro features vector directly, the micro feature classifier 255 may supply the micro feature vectors to a self-organizing map structure (SOM). In such a case, the ART network may cluster nodes of the SOM—and assign an object type identifier to each cluster. In such a case, each SOM node mapping to the same cluster is presumed to represent an instance of a common type of object.

As shown, the machine-learning engine 140 also includes a cluster layer 260 and a sequence layer 265. As described in greater detail below, the cluster layer 260 may be configured to generate clusters from the trajectories of objects classified by the micro feature classifier 255 as being an instance of a common object type. In one embodiment, the cluster layer 260 uses a combination of a self-organizing map (SOM) and an ART network to cluster the kinematic data in the trajectories. Once the trajectories are clustered, the sequence layer 265 may be configured to generate sequences encoding the observed patterns of behavior represented by the trajectories. And once generated, the sequence layer may identify segments within a sequence using a voting experts technique. Further, the sequence layer 265 may be configured to identify anomalous segments and sequences.

Figure 3:
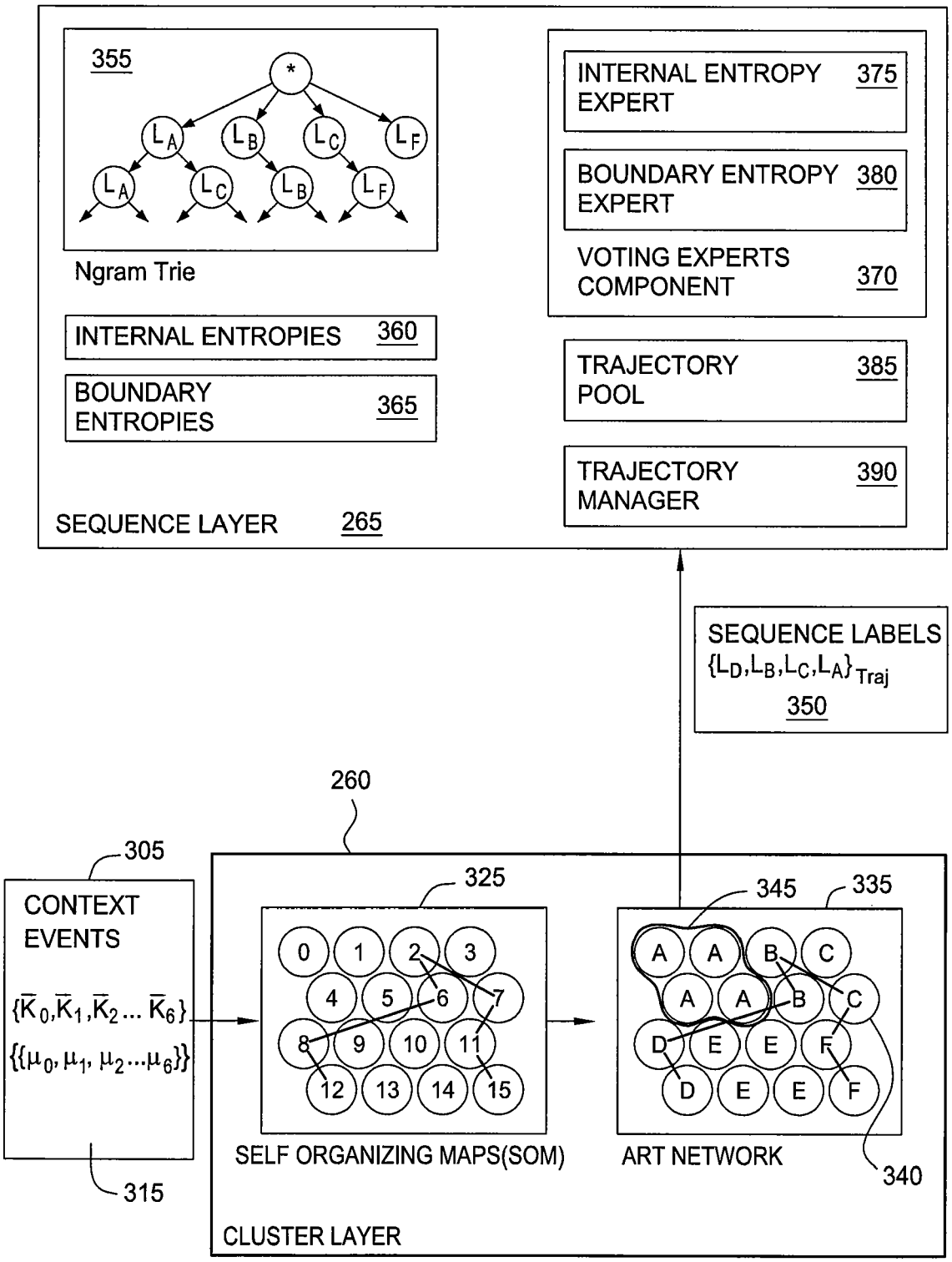
FIG. 3 further illustrates the sequence layer and cluster layer of the video analysis system first shown in FIG. 2, according to one embodiment of the invention.

FIG. 3 further illustrates the cluster layer 260 and the sequence layer 265 first shown in FIG. 2, according to one embodiment of the invention. As shown, the cluster layer 260 includes a self-organizing map (SOM) 325 and an ART network 345. The cluster layer 260 maps context events 305 to nodes of the SOM 325. Illustratively, the context events 305 include a trajectory vector 310 and a micro feature vector 315. The trajectory vector 310 includes the kinematic data $k_i$ for an object represented by the context event 315 sampled at a 5 Hz rate. That is, each element $k_i$ in the trajectory vector 310 stores the kinematic data derived for an object observed in the scene by the computer vision engine 135 at successive points in time. And each element $\mu_i$ in the micro feature vector 310 represents the micro features derived for that object at the same time as the corresponding $k_i$ element in trajectory vector 310.

In one embodiment, the cluster layer 260 maps elements in a trajectory vector included in a context event to a node in the SOM 325. That is, the SOM 325 may map each $k_i$ element of kinematic data tracking the trajectory of an object into a node of the SOM 325. Further, a SOM 325 may be maintained for each distinct type of object (as identified by the micro features classifier 255). Thus, kinematic data regarding an object actively present in the scene may be mapped into the SOM 325 as elements of the trajectory for that object are received (e.g., every 200 milliseconds).

For example, as shown in FIG. 3, the elements of $k_0$, $k_1$, $k_2$, $k_3$, $k_4$, $k_5$, and $k_6$ in the trajectory vector 310 are mapped to nodes 12, 8, 6, 2, 5, 11, and 15 in the SOM 325, respectively. Note, the particular sequence at which nodes of the trajectory vector 310 are mapped into the SOM 325 creates an ordered sequence $340_1$. In this case, the ordered sequence of nodes 12, 8, 6, 2, 5, 11, and 15. In one embodiment, the nodes of the SOM 325 are clustered using an ART network 335. For example, as shown, nodes 0, 1, 4, and 5 of SOM 325 create a cluster 345 (labeled as cluster "A") and nodes 9 and 12 create another cluster (labeled as cluster "B"). Once clustered, an ordered sequence $340_2$ may be generated, corresponding to sequence $340_1$. In this case, sequence $340_2$ is ordered as follows: D, D, B, B, C, F, and F. Removing redundant elements from sequence $340_2$ results in a sequence of D, B, C, F.

In one embodiment, the sequence layer 265 includes software modules configured to evaluate sequences generated by the cluster layer 260. Illustratively, the sequence layer 265 includes an ngram trie 355, internal entropies 360, boundary entropies 365, a voting experts component 370, a trajectory pool 385, and a trajectory management component 390.

FIG. 3 shows sequence labels 350 (which includes the labels of {D, B, C, F}) being supplied the sequence layer 265. The sequences received by the cluster layer 265 may be stored in a trajectory pool 385. In one embodiment, the trajectory manager 390 may monitor the number of completed trajectories in the pool 385 for objects of a given type. Once a threshold number of trajectories are available (e.g., 100) the trajectory manager 390 may generate the ngram trie 355, as well as determine the internal entropies 340 and the boundary entropies 365 for sequences in the ngram trie. Further, as new trajectories are completed, the trajectory manager 390 may update the ngram trie 355 (e.g., every time 50 new trajectories are received) as well periodically trim the ngram trie 355 to maintain a manageable trie size.

As described in greater detail below, the voting experts component 370 may use an internal entropy expert 375 and a boundary entropy expert 380 to evaluate a trajectory received from the cluster layer. In particular, the voting experts component 370 may segment the sequence of ART network labels in a given trajectory to maximize the entropy between two segments and minimize the internal entropy in each segment. Once segmented, the sequence layer may be configured to identify anomalous segments and sequences, relative to segments and sequences previously derived from the sequence of video frames and processed by the cluster and sequence layer.

Figure 4:
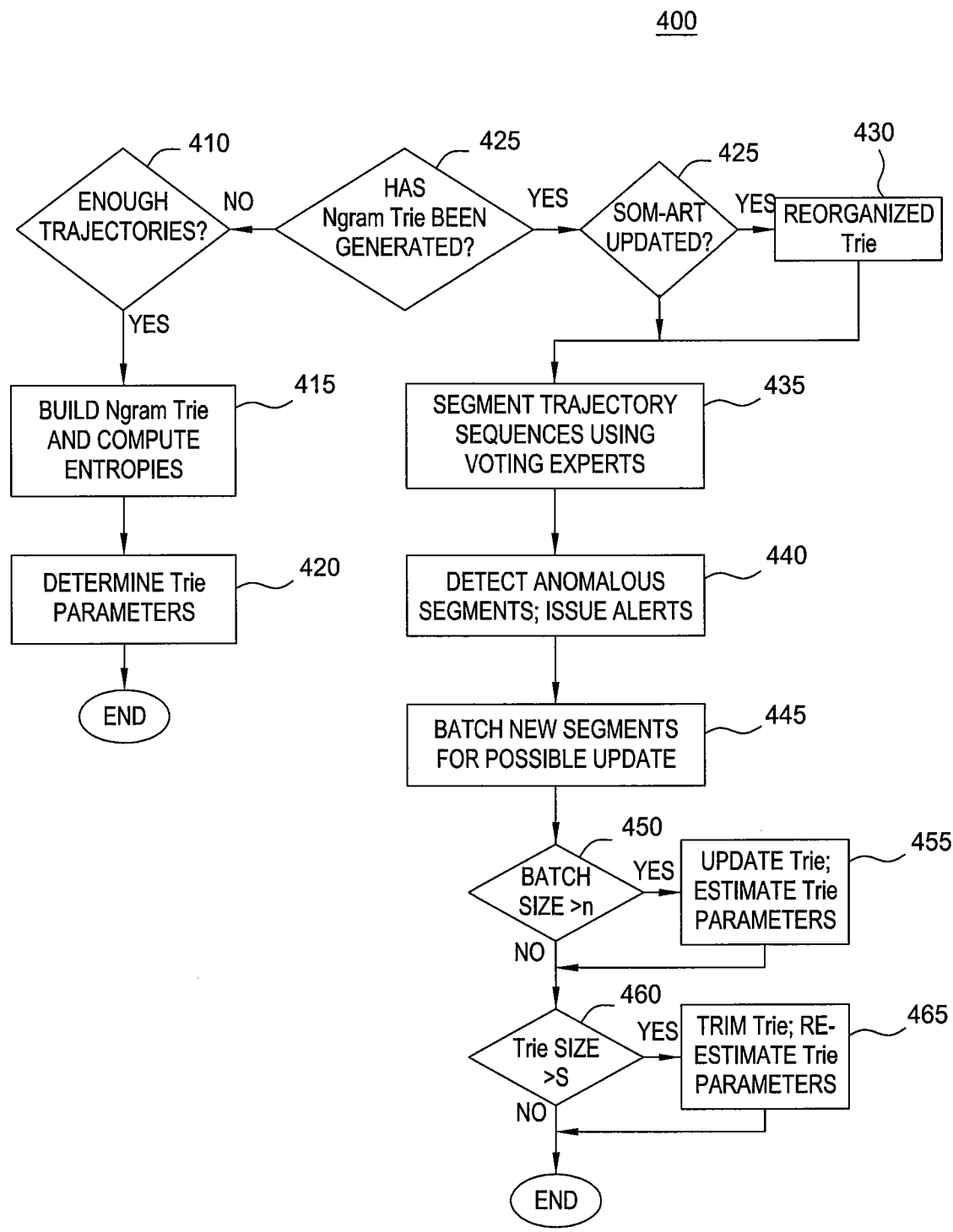
FIG. 4 illustrates a method for generating segments from a sequence of events observed to have occurred in a scene, according to one embodiment of the invention.

FIG. 4 illustrates a method 400 for segmenting a sequence of ART network labels assigned to elements of a trajectory, according to one embodiment of the invention. As noted above, the trajectory includes an ordered set of kinematic vectors describing the observed actions of a foreground object within a scene, e.g., sampled every 200 milliseconds. Further, the cluster layer may map the kinematic vectors to nodes within a SOM, and the nodes of the SOM may be clustered by an ART network. As new elements extend the trajectory of a given object, the new elements are mapped to clusters in an ART network extend the sequence for that object evaluated by the sequence layer. Further still, the voting experts in the cluster layer may segment the sequence and evaluate the results of the segmentation.

As shown, the method 400 begins at step 405, where the sequence layer determines whether an ngram trie has been generated for an object of a given object type (e.g., an object classified by the micro feature classifier of the machine-learning engine 140 or the estimator/identifier of the computer vision engine 135). If not, then at step 410, the sequence layer determines whether a threshold number of trajectory vectors are available for the given object type. If not, then the method 400 ends. Otherwise, at step 415, the sequence layer builds an ngram trie representing the completed trajectories observed for the given object type. Additionally, the sequence layer computes the internal and boundary entropies from the resulting sequences stored in the ngram trie. At step 420, the sequence layer determines a set of parameters for the voting experts to use in segmenting trajectory sequences of the given object type, based on the internal and boundary entropies of the ngram trie.

Figure 5A:
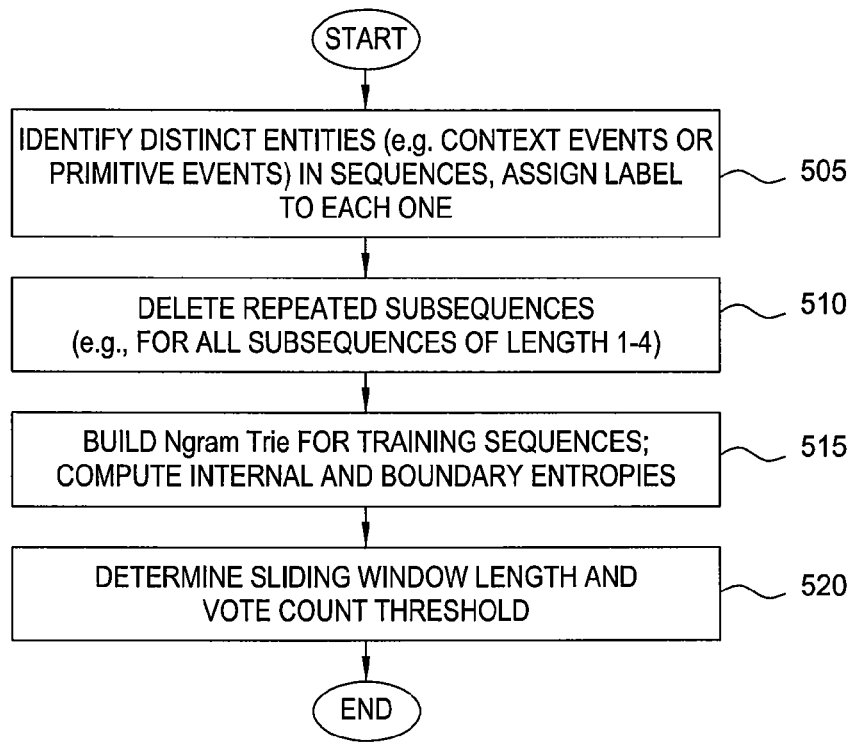
FIGS. 5A-5D illustrate a method for generating an ngram trie and determining parameters for segmenting a sequence of events observed to have occurred in a scene, according to one embodiment of the invention.

Steps 415 and 420 are further described relative to FIGS. 5A-5D. More specifically, FIG. 5A illustrates a method 500 for generating an ngram trie and determining parameters for the voting experts, according to one embodiment of the invention. As shown, the method 500 begins at step 505, where the sequence layer identifies distinct entities in the sequences and assigns a symbol to each one. For example, as described above the sequence may include the labels of ART cluster that each element in the trajectory vector is mapped. In such a case, the labels assigned at step 505 may be taken directly from the labels assigned to clusters in the ART network. At step 510, repeated subsequences may be deleted from the sequences (e.g., all subsequences of length 1 through 4). Doing so may improve the identification of internal and boundary entropies of individual segments in the sequences. For example, assume an ngram trie is being built from the following two sequences: {(a, b, b, c, d), (a, b, e, b, e, c, d)}. Deleting redundant elements from these training examples results in the following two rewritten sequences: {(a, b, c, d), (a, b, e, c, d)}.

Figure 5B:
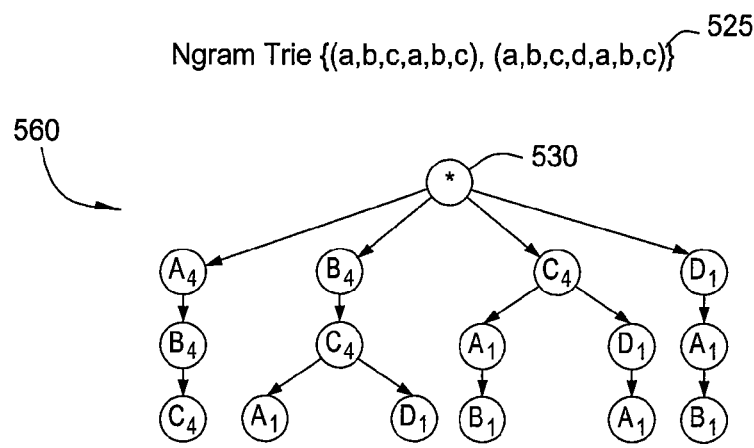

Once the repeated subsequences are deleted from the training sequences, the sequence layer generates an ngram-trie for all sequences in the training examples, up to a specified maximum depth (step 515). While the depth may be set as a matter of preference, in one embodiment the depth is set to a high value (relative to the kinematic sequence lengths (e.g., 20)). This approach allows the trie to be both trimmed and reorganized later on—resulting in a depth that automatically shrinks. For example, FIG. 5B illustrates a 3-level ngram trie 560 generated from the following two sequences: {(a, b, c, a, b, c), (a, b, c, d, a, b, c)}. The star (*) denotes the root node 530 of ngram trie 560. The ngram-trie 560 stores each observed subsequence (up to the length of 3) present in the training examples. Additionally, each node includes the frequency of that subsequence in the original training examples, starting from the first level in the ngram trie. For example, for substrings in the training set of length 1, the substring "A" appears four times, as do the substrings of "B" and "C," while the substring of "D" appears only once. Similarly, the substring of "BC" appears four times, and the substrings of "BCA" and "BCD" each appear once.

Also at step 515, the sequence layer determines the internal entropies ($H_I$) and boundary entropies ($H_B$) of all subsequences (limited to ngram trie depth). In one embodiment, the $H_I$ and $H_B$ may be determined as follows:

$$H_I(n_1, \ldots, n_i) = \log(Pr(n_1)) + \log(Pr(n_2 \mid n_1)) + \ldots + \log(Pr(n_i \mid n_1, \ldots, n_{i-1}))$$

$$H_B(n_1 \ldots, n_i) = -\sum_{j=1}^{m} Pr(n_{ij}) \log(Pr(n_{ij})),$$

where m is the total number of children of the node $n_i$ and where the probability (Pr) of node $n_{ij}$ being given by $Pr(n_{ij}) = f_{ij}/f_i$ with $f_i$ being the frequency of node $n_i$ and $f_{ij}$ being the frequency of $j^{th}$ child of node $n_i$.

In one embodiment, the sequence layer may standardize the raw internal and boundary entropies derived using the equations above to allow entropy of strings of different subsequence length to be compared directly. The standardized entropy values may be denoted as $\hat{H}_I$ and $\hat{H}_B$, respectively. The standardized entropies may be determined using $(x_i - \bar{x})/\sigma$, where $x_j$ denotes the current entropy value, and $\bar{x}$ and $\sigma$ denote the mean and standard deviations of the entropy under consideration (internal or boundary) in the current level of the ngram trie.

At step 520, the sequence layer estimates parameters for the voting experts to use in segmenting sequences generated by the clustering layer. In one embodiment, the voting experts evaluate a sequence using a sliding window and a vote count threshold. Accordingly, at step 520, the sequence layer determines values for these parameters needed buy the voting experts.

Once the standardized internal $\hat{H}_I$ and standardized boundary $\hat{H}_B$, entropies for all subsequences (limited to ngram trie depth) are computed, empirically estimate the sliding window length (L) and vote count threshold (V) as follows:

$$L = \left\lceil \frac{\operatorname{argmax}(\hat{H}_I) + \operatorname{argmax}(\hat{H}_B)}{2} \right\rceil$$

$$V = \left\lceil \frac{\sum_{i=1}^{n} \operatorname{argmax}(\hat{H}_I)_i + \operatorname{argmax}(\hat{H}_B)_i}{2n} \right\rceil,$$

where n is the total number of branches in the trie and where argmax ( ) returns the level of the node in the trie that has the highest entropy. More specifically, (L) denotes the average of argmax values for $\hat{H}_I$ and $\hat{H}_B$ along all paths in the trie, while (V) denotes the average of argmax values for $\hat{H}_I$ and $\hat{H}_B$ along each path in the trie.

Returning to step 405 of the method 400 shown in FIG. 4, if an ngram tire has been generated, then at step 425, the sequence layer may determine whether the SOM-ART structures maintained by the cluster layer have been updated. For example, the ART network in the cluster layer may merge two clusters in the ART network and assign a new label to the merged clusters. Using the ART network 335 of FIG. 3, assume that cluster 345 labeled "A" is merged with the cluster labeled "B." In such a case, a new label "G" could be assigned to the merged cluster. In one embodiment, the sequence layer 265 may be configured to reorganize the ngram trie, based on changes to the sequences used to generate the trie.

Figure 5C:
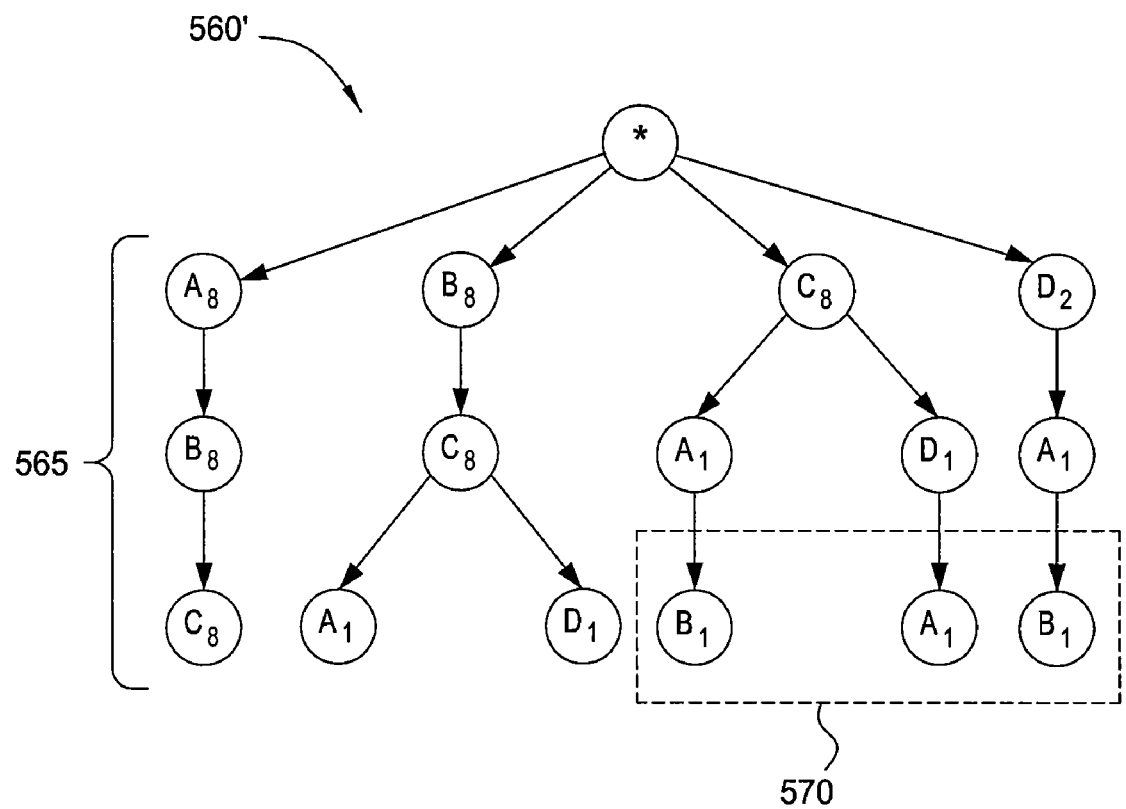
Figure 5D:
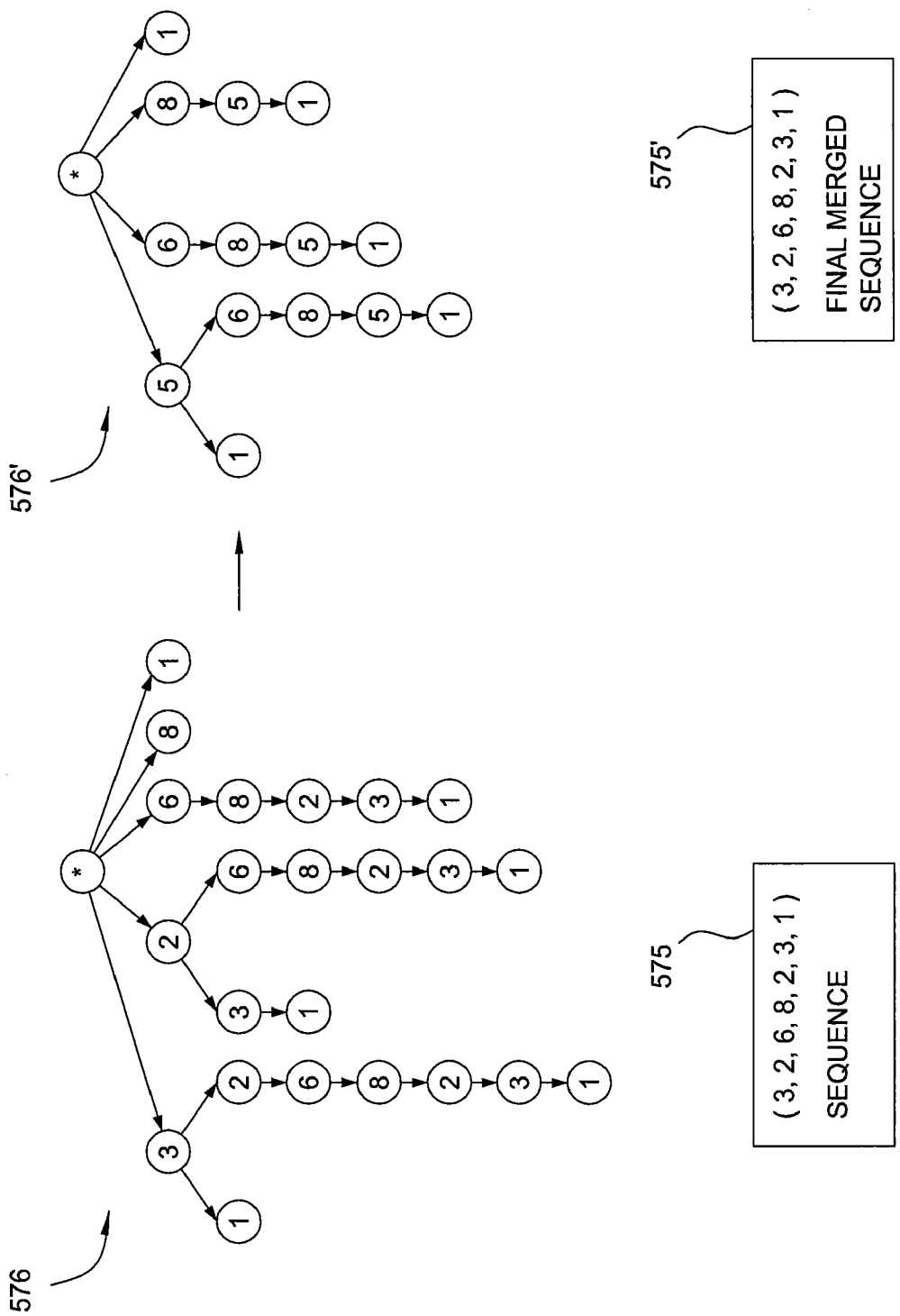

FIG. 5D illustrates an example reorganizing an ngram trie in response to merging sequence labels, according to one embodiment of the invention. Illustratively, a sequence 575 of (3, 2, 6, 8, 2, 3, 1) is used to generate a complete ngram trie 576 (i.e., a trie to a depth of 7, the length of the training sequence). Merging the symbols "3" and "2" to form a symbol "5" results in a revised sequence of (5, 5, 6, 8, 5, 5, 1). In one embodiment, prior to reorganizing the trie 576, redundant subsequences are removed in the manner described above. This results in a final sequence of (5, 6, 8, 5, 1). Trie 576' shows the reorganization of trie 576, based on the merging of symbols (3, 2).

Once the ngram-trie is reorganized, the node frequencies change. As a result, some of the entropies computed prior to the reorganization will no longer be correct. Accordingly, the sequence layer may re-compute the raw and standardized internal and boundary entropies for all the nodes in the trie, in the manner described above.

At step 435, once the sequence layer determines the appropriate values for the sliding window length (L) and vote count threshold (V), new sequences generated from an emerging (or complete) sequence received from the cluster layer may be subdivided into one or more segments using the voting experts. In one embodiment, the voting experts component of the sequence layer passes a sliding window of length L along new sequences received from the cluster layer. For each window $w = (x_1, \ldots, x_L)$, the internal entropy expert and the boundary entropy expert each vote for a boundary at which to split the elements of the sequence visible in the window. The internal entropy expert assigns a vote to the symbol boundary between symbols $x_i$ and $x_{i+1}$ that minimizes the internal entropy of the two induced subsequences. On the other hand, the boundary entropy expert assigns a vote to the symbol boundary between $x_j$ and $x_{j+1}$ that maximizes the boundary entropy. Both the experts use the ngram-trie to perform these calculations. Once the voting experts analyze each window of length L in the sequence, splits are induced at each point in the sequence that meets the vote count threshold V.

For example, given the trie 560 shown in FIG. 5B, assume a new sequence of (b, c, a, b, c) is received for segmentation. Also assume a sliding window length (L) of 3 and a vote count threshold (V) of 2. In such a case, the first sliding window is (b, c, a) and the internal boundary expert will vote to place a boundary of ((b, c)|(a)), as the segments of (b, c) and (a) have less internal entropy than the segments that result from the split of ((b)|(c, a)). Similarly, the boundary entropy expert will vote to place a boundary of ((b, c)|(a)), as the segments of (b, c) and (a) have a higher boundary entropy between them than the segments that result from the split of ((b, c)|(a)). These results follow from the structure of ngram trie 560 and the entropies determined at step 510. The window then "slides" and the next subsequence is evaluated, in particular the subsequence (c, a, b). The experts again vote on how to split this window—the internal boundary expert voting to split the sequence to minimize internal subsequence entropy and the boundary entropy expert voting to maximize entropy between subsequences. After evaluating each window of length 3 in the same manner, the voting experts component counts the votes and splits the sequence by inducing segments at each boundary that accumulated enough votes to meet the vote count threshold.

At step 440, the sequence layer may evaluate whether segments generated by the voting experts are anomalous, relative to segments and sequences previously derived from the sequence of video frames and processed by the cluster and sequence layer. If so, the machine-learning engine 140 may generate alerts presented to users via a graphical user interface. Examples of techniques for identifying both inter-trajectory and intra-trajectory anomalies are discussed below, relative to FIGS. 7-9.

At step 445, the sequence layer may store the segments generated by the voting experts at step 435. The segments may be saved in a pool of segments periodically used to update the ngram trie and voting experts parameters (L) and (V). In one embodiment, the ngram trie used by the voting experts component of the sequence layer may be updated using new sequences and segments as they are generated from analyzing frames of video. Further, the machine learning-engine may be configured to allow users to specify the number of segments that should be accumulated in the pool prior to a batch update. Once enough segments are accumulated, the segments in the pool are used to update the ngram trie as well as the sliding window length (L) and vote count threshold (V).

FIG. 5C illustrates an example of an update to the 3-level ngram trie 560 shown in FIG. 5B. Note, the ngram trie 560 in FIG. 5B was generated from the following training sequences: {(a, b, c, a, b, c), (a, b, c, d, a, b, c)}. Assume that the voting experts component evaluates these training sequences, resulting in the following segments: {(a, b, c), (a, b, c), (a, b, c), (d), (a, b, c)}. FIG. 5C illustrates an ngram trie 560' updated using these segments in conjunction with the original training sequences. Note, the segmentation of the input training sequences does not produce any new distinct subsequences, so the branch structure of the ngram trie 560 remains unchanged. However, updating the trie using the segments generated by the voting experts does change the relative distribution of different subsequences. That is, once the ngram trie 560 is updated (resulting in ngram trie 560'), the node frequencies change. As a result, the entropies computed prior to the update are no longer correct. Accordingly, at step 455, the sequence layer may re-compute the raw and standardized internal and boundary entropies for all the nodes in ngram trie 560' and the sliding window length (L) and vote count threshold (V).

At step 460, the sequence layer may evaluate the size of the ngram trie. If the number of nodes in the trie exceeds a specified threshold, selected nodes may be trimmed from the ngram trie (step 465). In one embodiment, the nodes with the lowest observed frequencies in the trie are identified (based on raw internal entropies of all the nodes). Then such nodes are trimmed starting from the deepest level in the trie, until a specified percentage of nodes have been trimmed. For example, assume that the ngram trie 560' of FIG. 5B exceeds a user defined threshold, and that the 20% of the nodes are going to be cut. This results in nodes 570 being removed from the ngram trie 560'. Once the ngram trie is trimmed, the node frequencies change. As a result, some of the entropies computed prior to trimming will no longer be correct. Accordingly, at step 465, the sequence layer may re-compute the raw and standardized internal and boundary entropies for all the nodes in ngram trie 560' and the sliding window length (L) and vote count threshold (V).

As noted above, in one embodiment, the voting experts may evaluate a sequence as it emerges from the cluster layer. For example, as each new context event is supplied to the cluster layer, mapped to the nodes of a self-organizing map (SOM), and clustered by the ART network, the resulting sequence labels added to the sequence evaluated by the voting experts. Further, in one embodiment, the sequence layer may provide predictive feedback to the cluster layer as to a prediction for a next symbol. Such information may be used to guide how a given context event is processed by the cluster layer, i.e., how a given context event is mapped to the SOM and clustered by the ART network.

Figure 6:
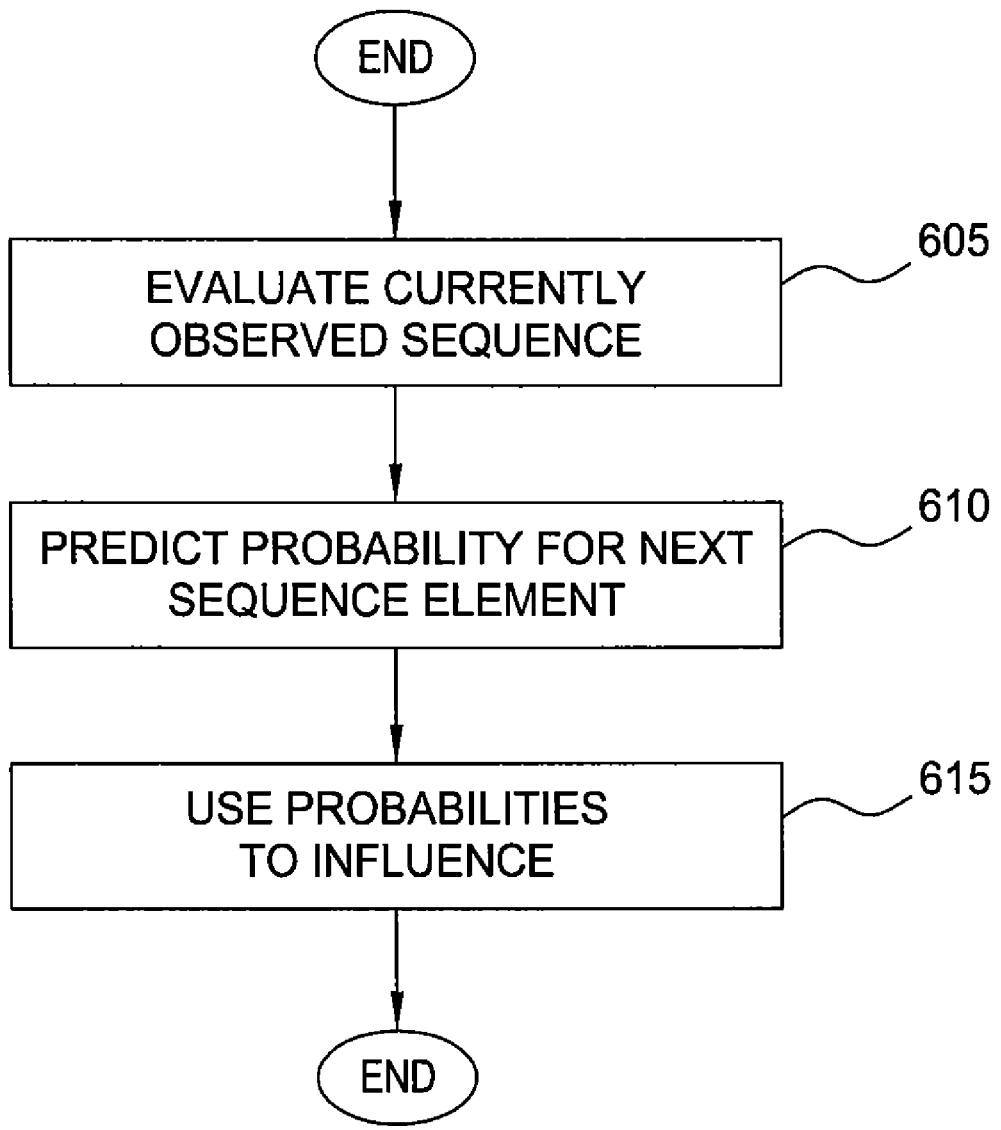
FIG. 6 illustrates a method for providing predictive feedback to components of a video surveillance system, according to one embodiment of the invention.

FIG. 6 illustrates a method 600 for providing predictive feedback to components of a video surveillance system, according to one embodiment of the invention. As shown, the method begins at step 600 where the sequence layer evaluates an incomplete or partial sequence. At step 610, the sequence layer predicts the probabilities for the next element in the sequence. Note, as described above, the raw and standardized internal and boundary entropies of all the nodes in the ngram trie are pre-computed before the segmentation of new sequences. Therefore, when a current (but incomplete trajectory) is supplied to the sequence layer, the voting experts can readily identify the probability of each possible symbol that can arrive next in the incomplete sequence and supply a list of symbols with corresponding probabilities to the cluster layer. At step 610, the cluster layer may use the probabilities to influence the next symbol generated from the next context event. In particular, expectation maximization techniques may be used here. More specifically, the sequence layer may provide an expectation of the next symbol to be received and the cluster layer may maximize the probability of the next symbol by influencing the SOM nodes and ART labels to get the expected symbol.

As discussed above, the sequence layer of the machine-learning engine may be configured to segment a string of sequence labels generated from a trajectory vector. The completed trajectory vector includes the kinematic observations of an object's behavior for the period the object is visible in the scene. The kinematic observations may be mapped to nodes of a SOM and an ART network labels the nodes of the SOM. The resulting labels assigned to by the ART network may provide the sequence for segmentation by the sequence layer.

In one embodiment, the resulting segments may be evaluated to identify anomalous ones, relative to a probability distribution generated from the entropies of segments present in the ngram trie (corresponding to a given object type). For example, FIG. 7B illustrates a 3-level ngram trie 750 generated from the training sequences of {(a, b, c, a, b, c), (a, b, c, d, a, b, c)}. Additionally, the internal entropies for nodes 755, 760, and 765 are listed. Note, the internal entropies shown for nodes 755, 760, and 765 are normalized to the number of symbols (N) in the first level, thirteen in the ngram trie 750. Accordingly, subsequences can be compared against one another regardless of length. For example, the internal entropy of subsequence of (c, d, a) of node 765, which appears once in the trie 750, may be compared against the internal entropy of subsequence (c, a) of node 760 directly.

Further, as all the internal entropies in the ngram trie are normalized, trie statistics can be modeled based on the internal entropies. In one embodiment, an exponential distribution may be used to model the probability density function of internal entropy (H) of the subsequences in the trie. For example, FIG. 7C shows an exponential probability distribution 775 generated from the ngram trie 750 of FIG. 7B. As shown in FIG. 7C, the least prevalent segment(s) in the trie 750 have an internal entropy of $\log(1/N)$ where N is the number of symbols in the first level and the mean entropy is given by $(\mu H)$.

In one embodiment, the probability distribution function for a given ngram trie is used to determine whether a segment generated by the sequence layer is anomalous. When such a segment is identified, the machine-learning engine may generate an alert indicating that an anomalous event has been occurred. Further, the machine-learning engine may assign a measure of severity to each such alert. For example, alerts may be assigned a "temperature" using a range such as a real-numbered value between 0 (the lowest alert temperature) and 1 (the highest alert temperature).

Figure 7A:
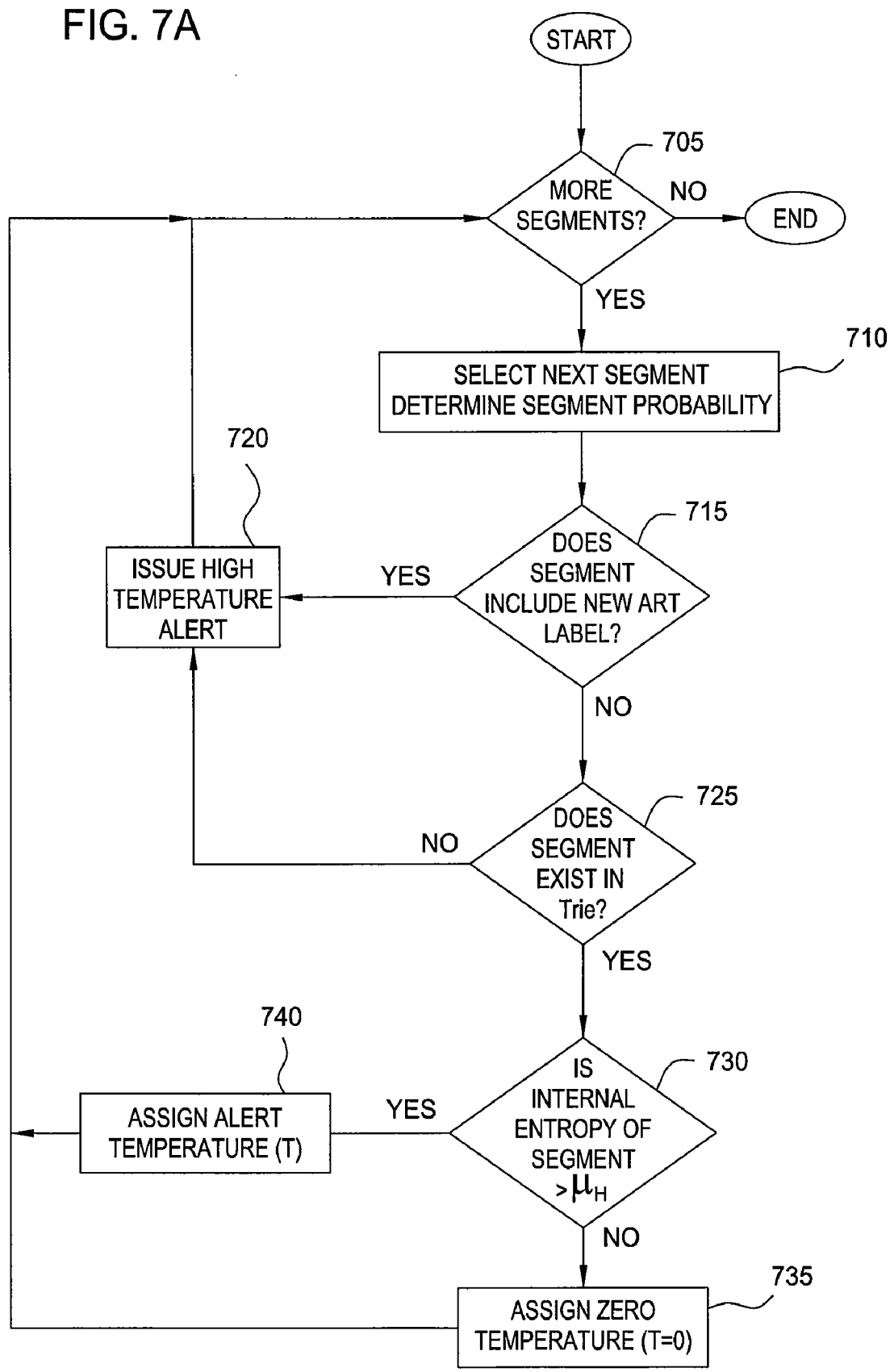
FIG. 7A-7C illustrate a method for detecting intra-trajectory anomalies in sequences observed by a video surveillance system, according to one embodiment of the invention.
Figure 7B:
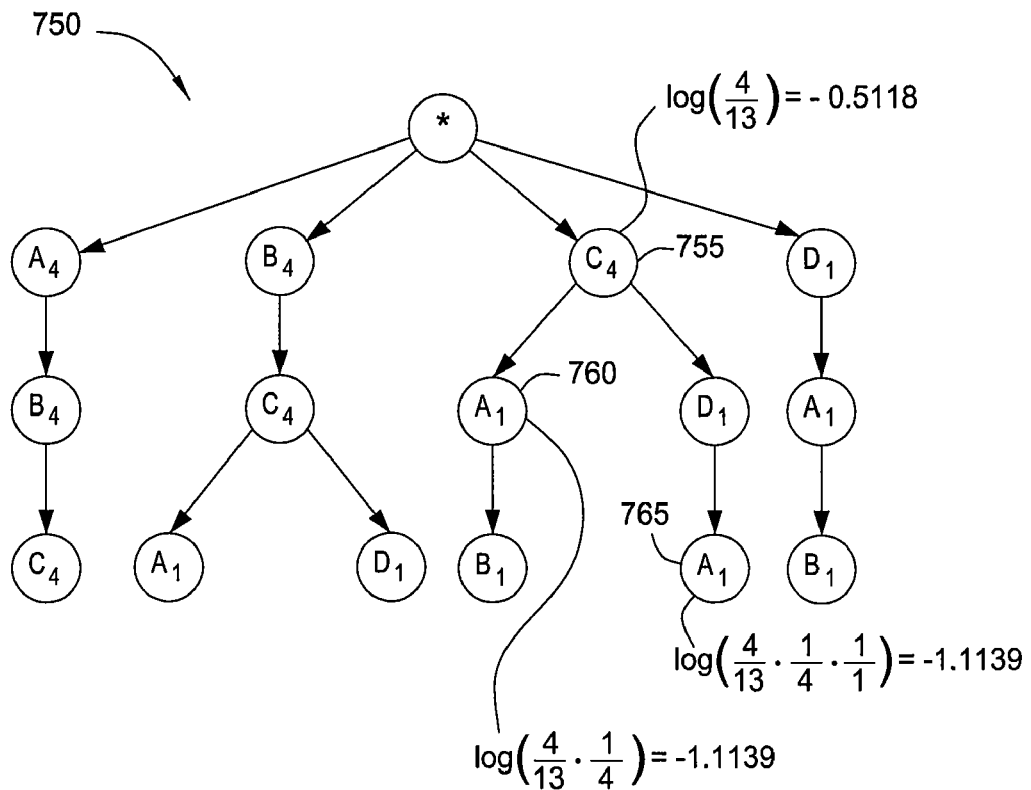
Figure 7C:
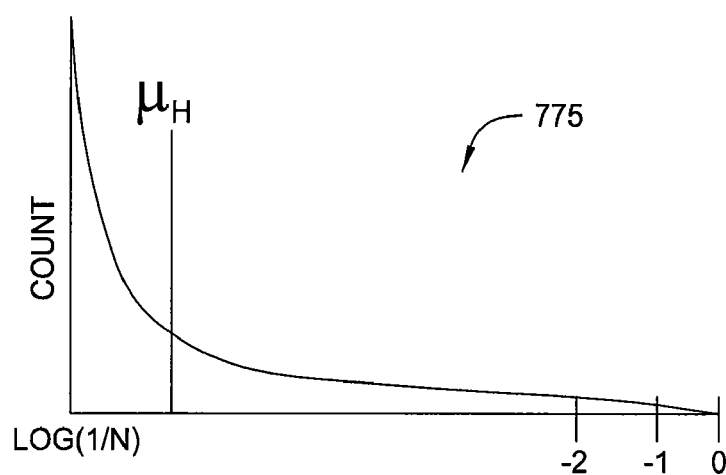

FIG. 7A illustrates a method 700 for detecting intra-trajectory anomalies in sequences observed by a video surveillance system, according to one embodiment of the invention. The method 700 may be performed to evaluate segments generated from a complete (or incomplete) trajectory of an object observed in a sequence of video frames. As shown, the method 700 begins at step 705 where the sequence layer determines whether more segments remain to be evaluated. If not, the method 700 ends. Otherwise, at step 710, the sequence layer selects a segment to evaluate.

At step 715, the sequence layer determines whether the segment includes an element not previously observed, resulting in a segment probability of 0. That is, the segment under consideration includes a label not present in the ngram trie. This may result from, e.g., a new (or merged) cluster in the ART network being generated in response to the content of a trajectory vector. If the segment includes a previously unseen sequence element, then at step 720, the segment may be identified as anomalous and an alert is issued. In other words, when a new ART label is identified in a current segment (step 715), that segment may be assigned a high alert temperature, e.g., T=1.00 (step 720). A new ART label indicates that the corresponding trajectory vector did not match with any previously observed kinematics of the object type associated with the trajectory vector, and may therefore be assigned a high measure of alert severity.

At step 725, the sequence layer determines whether the segment under consideration is present in the ngram trie. If the probability of the segment is 0, i.e., if the segment cannot be traced in the ngram trie, then that segment may be assigned high alert temperature (e.g., T=0.9996). That is, when a segment is not available in the ngram trie, even though each symbol in the segment is in the trie, it means that the segment was never observed before by the sequence layer, and is therefore assigned a high alert temperature.

If the probability of the segment is non-zero, i.e., if the segment can be traced through the current ngram trie, then at step 730, the sequence layer determines whether the internal entropy is above (or below) mean, µH. At step 735, if the internal entropy of the segment under consideration is bigger than the mean, µH, then that segment may be considered normal and given an temperature of T=0.00. Otherwise, if the internal entropy of the segment under consideration is smaller than the mean, µH, then that segment may be assigned an alert temperature. In one embodiment, the following equation may be used to assign an alert temperature to an segment identified as being anomalous:

$$\text{Alert Temperate } T = .9995 \cdot \left(\frac{H - \mu_H}{\log(1/N) - \mu_H}\right),$$

where H represents the internal entropy of the current segment. Note that as the entropy, H, decreases towards log(1/N), the temperature increases towards 0.9995. Of course, other approaches may be used to determine a measure of alert severity or to identify identifying a segment as being anomalous.

Figure 8:
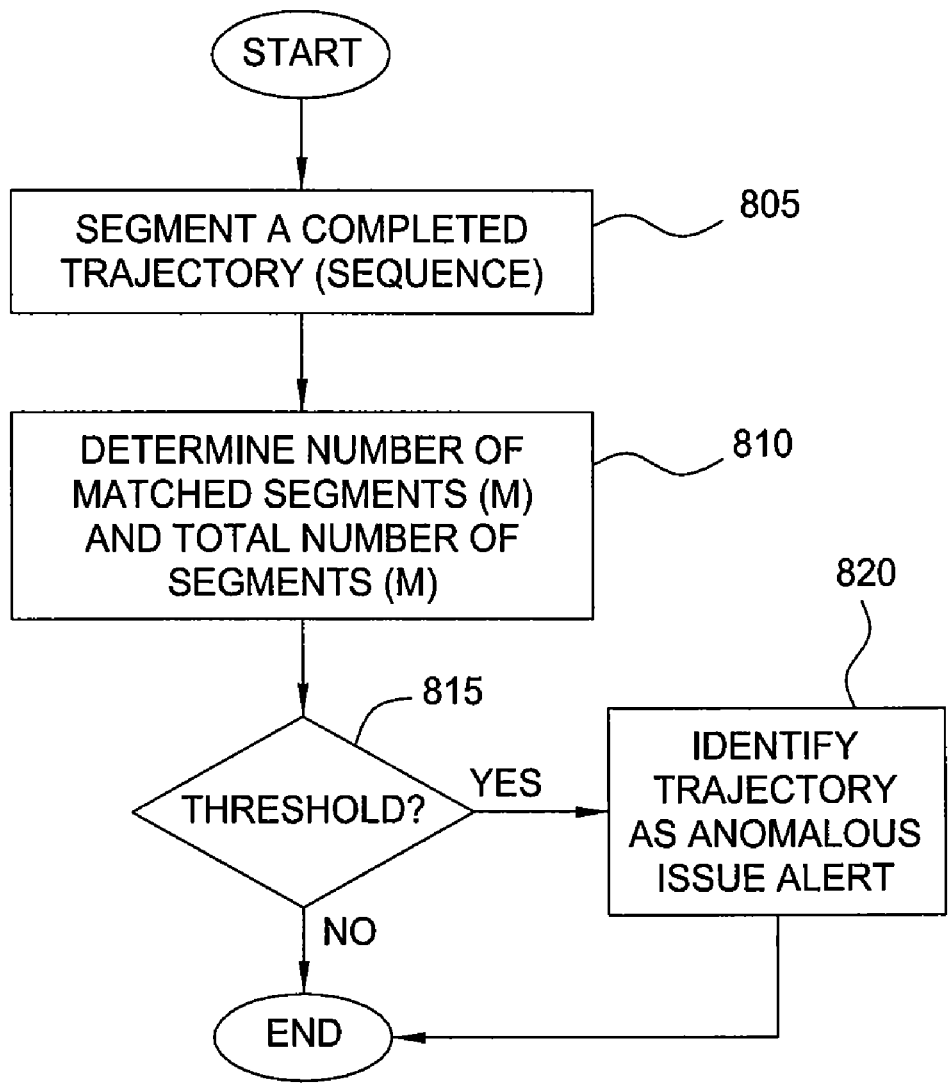
FIG. 8 illustrates a method for detecting intra-trajectory anomalies in a completed sequence observed by a video surveillance system, according to one embodiment of the invention.

In addition to evaluating the segments induced by the voting experts for a particular segment, the particular sequence itself may also be evaluated. For example, the sequence layer may evaluate a sequence relative to the number of segments generated from the sequence that correspond to a branch of the ngram trie. FIG. 8 illustrates a method for detecting intra-trajectory anomalies in a completed sequence observed by a video surveillance system, according to one embodiment of the invention. As shown, the method 800 begins at step 805 where the voting experts use an ngram trie, sliding window and vote count to induce a number of segments M, which maximize entropy between segments and minimize entropy within segments. At step 810, the sequence layer identifies a number of segments m generated by the voting experts match a subsequence in the trie. And at step 815, the sequence layer determines whether the ratio of m/M is below specified threshold, then the trajectory itself may be identified as anomalous and an alert issued (step 820). The alert may be assigned an alert temperature (e.g., T=0.9996). While the threshold and alert temperatures may be set as a matter of preference, a threshold of 0.50 may be used.

FIG. 9 illustrates a method 900 for detecting inter-trajectory anomalies in sequences derived from an input stream of video frames, according to one embodiment of the invention. As shown, the method 900 begins at step 905 where an interaction between a first foreground object and a second foreground object in the scene is identified. As described above, the behavior of objects identified in a scene may be used to generate a sequence (e.g., a sequence of ART network labels) and sequences for objects of the same type are used to generate an n-gram trie segmented by voting experts in the sequence layer. That is, in a scene, many objects may interact with other objects in the scene and those interactions may be encoded in the sequence layer ngram trie.

Figure 9A:
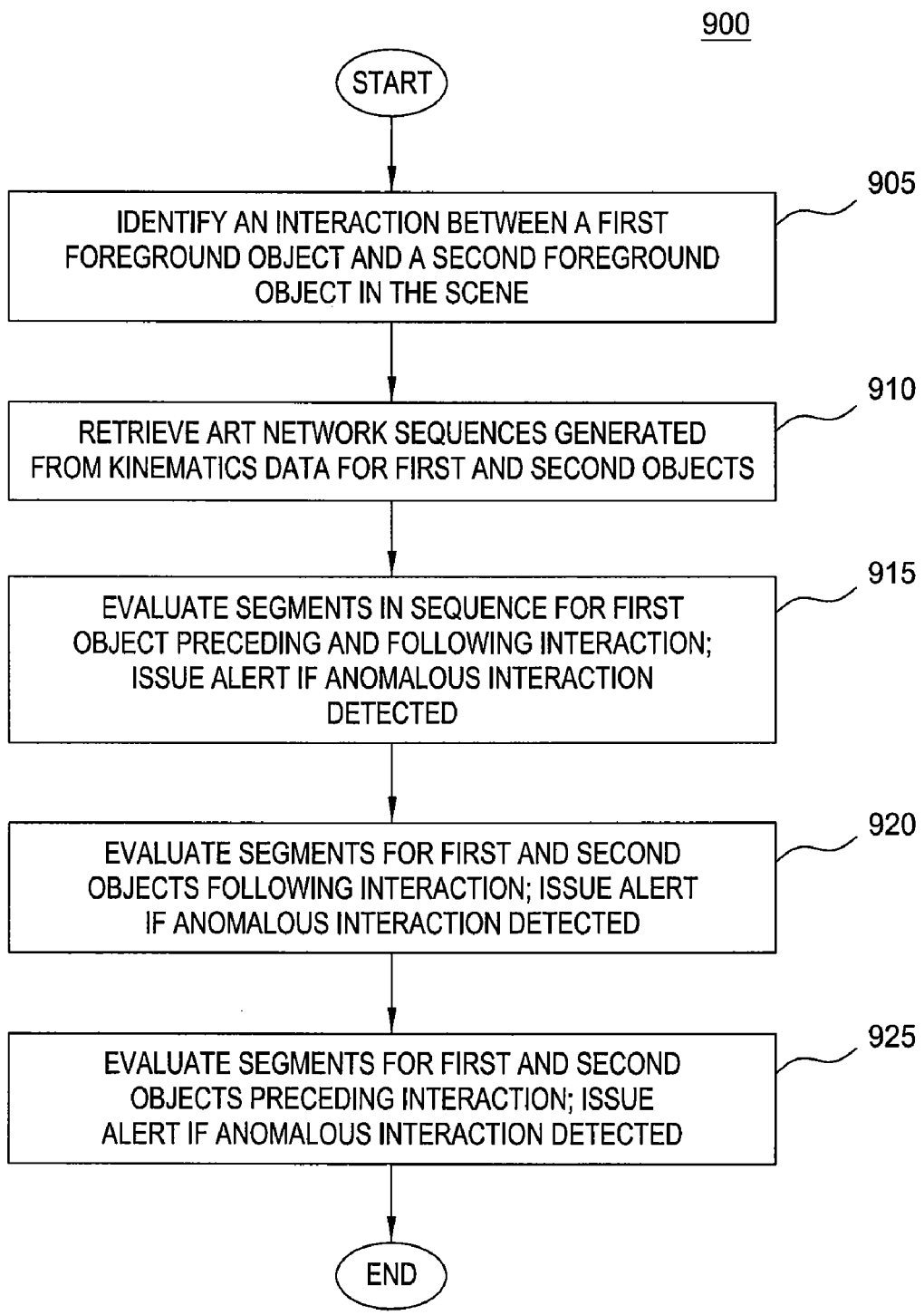
FIGS. 9A-9D illustrates a method for detecting inter-trajectory anomalies in interacting sequences observed by a video surveillance system, according to one embodiment of the invention.
Figure 9B:
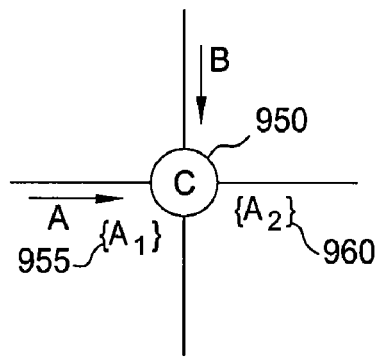

After identifying an interaction between two foreground objects, at step 910, the ART network sequences generated from the kinematic data for the first and second objects may be retrieved. And at step 915, the segments generated by the voting experts component that correspond to the segment before and after the interaction are identified. For example, FIG. 9B illustrates an example of two segments $\{A_1\}$ 955 and $\{A_2\}$ 960 in a first trajectory "A" before and after interaction with a second trajectory "B." In particular, intersection C 950 indicates a point in time where the observed trajectories A and B interacted with one another. Segments $\{A_1\}$ 955 and $\{A_2\}$ 960 represent the "before" and "after" segments in trajectory A, relative to interaction C 950.

In one embodiment, to identify whether interaction C is abnormal for trajectory A, two conditional probabilities are determined—the probability of segment $A_2$ given sequence element C and the probability of C given $A_1$ denoted as $Pr(A_2|C)$ and $Pr(C|A_1)$. The value for $Pr(A_2|C)$ is available directly in the ngram trie associated with trajectory A, and can be extracted by tracing the corresponding sequence element (i.e., node C) followed by segment $\{A2\}$—(C, $\{A2\}$)—in the ngram trie. Although $Pr(C|A_1)$ is not directly available in ngram trie, Bayes theorem gives:

$$Pr(C \mid A_1) = \frac{PR(A_1) \cdot Pr(A_1 \mid C)}{Pr(C)}$$

Each value of the right hand of the equation above is available directly from the ngram trie for sequence A. Thus, both $Pr(C|A_1)$ and $Pr(A_2|C)$ may be computed. If any of these two probabilities are below a user specified threshold, then an alert may be issued indicating that corresponding segment (and therefore the interaction of the first object with the other object depicted in the video) has been identified as being anomalous.

Figure 9C:
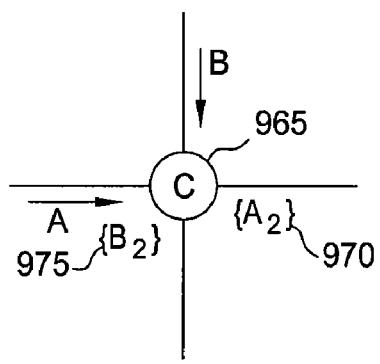

At step 920, the segments generated by the voting experts for the first and second objects following the interaction between the objects may be evaluated. If the probability of either segment falls below a user specified threshold, then an alert may be issued indicating that an interesting or unusual event has occurred. This scenario is illustrated in FIG. 9C. In particular, FIG. 9C shows segments in two trajectories for object "A" and object "B" just after interaction "C" 965. In particular, segments $\{A_2\}$ 970 and $\{B_2\}$ 975 represent the segments generated by the voting experts from the observed trajectories of objects A and B, following interaction C 965. That is, the interaction between the objects is indicated by node C 965, while $\{A_2\}$ 970 and $\{B_2\}$ 975 denote the segments in trajectories A and B, respectively, after the interaction C. If the segments $\{A_2\}$ and $\{B_2\}$ are considered independent (i.e., the probability of the segments are independent to one another), then by independence property:

$$Pr(A_2 \cap B_2) = Pr(A_2) \cdot Pr(B_2)$$

That is, the probability of A and B occurring is the product of the individual probabilities of A occurring and B occurring. And the conditional independence of the segments from the ngram trie gives:

$$Pr(A_2 \cap B_2 | C) = Pr(A_2 | C) \cdot Pr(B_2 | C)$$

Both probability values in the right hand side of this equation may be extracted from the ngram trie in the sequence layer directly. If the product of these probabilities falls below a user specified threshold, then an alert may be issued indicating that the occurrence of segments in trajectory "A" and trajectory "B" following interaction C 965 are anomalous, relative to previously observed behavior.

Figure 9D:
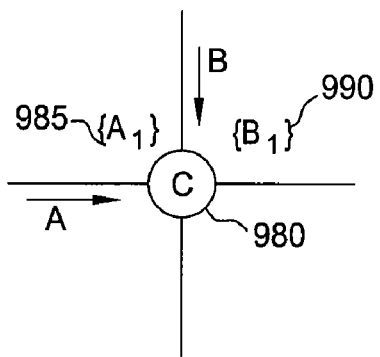

Similarly, at step 925, the segments generated by the voting experts for the first and second objects preceding the interaction between the objects may be evaluated. This scenario is illustrated in FIG. 9D. In particular, FIG. 9D shows segments in two trajectories for object "A" and object "B" just prior to interaction "C" 980. In particular, segment $\{A_1\}$ 985 and $\{B_1\}$ 990 represent the segments generated by the voting experts from the observed trajectories of objects A and B, just before interaction C 980. That is, the interaction between the objects is indicated by node C 980, while segment $\{A_1\}$ 985 and segment $\{B_1\}$ 990 denote the segments in trajectories A and B, respectively, after the interaction C 980. If the segments $\{A_1\}$ and $\{B_1\}$ are considered independent, then the probabilities $\{A_1\}$ and $\{B_1\}$ occurring prior to intersection C 980 is given by the following equations.

$$Pr(A_1 | C \cap B_1) = Pr(C | A_1) \cdot Pr(C | B_1)$$
$$= \frac{Pr(A_1) \cdot Pr(A_1 | C)}{Pr(C)} \cdot \frac{Pr(B_1) \cdot Pr(B_1 | C)}{Pr(C)}$$

Note that each of the six probabilities on the rightmost side of the above equations can be directly extracted from the ngram trie in the sequence layer and if the final product of these probabilities (i.e., the joint conditional probability on the leftmost side of the equation) falls below the threshold, then an anomaly may be issued indicating that the segments in both trajectories just before the interaction are abnormal. And accordingly, an alert may be issued indicating that the occurrence of segments in trajectory "A" and trajectory "B" prior to interaction C 980 is anomalous, relative to previously observed behavior.

Advantageously, as described, embodiments of the invention provide a sequence layer in a machine-learning engine configured to learn from the observations of a computer vision engine. In one embodiment, the machine learning engine uses the voting experts to segment ART label sequences for different objects observed in a scene. The sequence layer may be configured to observe the ART label sequences and incrementally build, update, and trim an ngram trie for those label sequences. The sequence layer computes the entropies for the nodes in the ngram trie and determines a sliding window length and vote count parameters. Once determined, the sequence layer may segment newly observed sequences to estimate the primitive events observed in the scene. Doing so allows basic units of behavior to be identified, without having the units of behavior to be identified in advance. The sequence layer also provides the feedback to the cluster layer in terms of expected next labels so that the cluster layer can maximize that expectation.

While the foregoing is directed to embodiments of the present invention, other and further embodiments of the invention may be devised without departing from the basic scope thereof, and the scope thereof is determined by the claims that follow.

What is claimed is:

1. A computer-implemented method for analyzing a scene depicted in an input stream of video frames captured by a video camera, the method comprising:

receiving a plurality of sequences, wherein each sequence stores an ordered string of labels assigned to clusters in an adaptive resonance theory (ART) network, wherein the ART network clusters nodes of a self-organizing map (SOM), and wherein the SOM is generated by mapping, to nodes of the SOM, kinematic data vectors generated for foreground objects detected in the input stream of video frames;

generating, from the plurality sequences, an ngram trie to a specified depth, wherein the ngram trie includes a node for each subsequence present in the plurality of sequences, up to the specified depth;

determining, for each node in the ngram trie, an entropy measure based on a count of how many times the subsequence represented by the node appears in the plurality of sequences;

receiving a first sequence; and determining, in the first sequence, one or more segments, based on the determined entropies.

2. The computer-implemented method of claim 1, further comprising, prior to generating the ngram trie, deleting any repeated subsequences in the ordered string of labels in each of the plurality of sequences, up to a specified length.

3. The computer-implemented method of claim 1, wherein determining, in the first sequence, one or more segments, comprises:

evaluating subsequences in a sliding window of length (L), wherein an internal entropy expert and a boundary entropy expert each vote a position in each sliding window subsequence at which to split the sliding window sequence; and inducing a segment boundary at each position in the first sequence that receives at least a number of votes satisfying a vote count threshold (V).

4. The computer-implemented method of claim 3, wherein:

the internal entropy expert votes to minimize internal entropy by selecting a position which minimizes internal entropy in each respective sliding window sequence, based on the determined entropies; and the boundary entropy expert votes by selecting a position in each respective sliding window that maximizes entropy between segments in the sliding window subsequence.

5. The computer-implemented method of claim 3, further comprising, determining the sliding window length (L) as $$L = \left\lceil \frac{\mathrm{argmax}(\hat{H}_I) + \mathrm{argmax}(\hat{H}_B)}{2} \right\rceil,$$

wherein $\hat{H}_I$ and $\hat{H}_B$, represent a standardized entropy value for the entropy measure determined for each node in the ngram trie and argmax( ) returns a level of the node in the trie with the greatest entropy values for $\hat{H}_I$ and $\hat{H}_B$.

6. The computer-implemented method of claim 3, wherein the vote count threshold (v) is determined as follows $$V = \left\lceil \frac{\sum_{i=1}^{n} \mathrm{argmax}(\hat{H}_I)_i + \mathrm{argmax}(\hat{H}_B)_i}{2n} \right\rceil,$$

wherein $\hat{H}_I$ and $\hat{H}_B$, represent a standardized entropy value for the entropy measure determined for each node in the ngram trie, wherein n represents a total number of branches in the ngram trie and argmax( ) returns a level of the node in the trie with the greatest entropy values for $\hat{H}_I$ and $\hat{H}_B$.

7. The computer-implemented method of claim 1, further comprising:
receiving an partial sequence of ART network labels generated from a set of kinematic vectors derived for a foreground object being tracked from frame-to-frame in the input stream of video frames, wherein the set of kinematic vectors are mapped to nodes of the SOM and clustered by the ART network; and
predicting a next element of the second sequence based on the determined entropies in the ngram trie.

8. The computer-implemented method of claim 1, further comprising:
accumulating a threshold number of segments from observations of one or more foreground objects tracked from frame-to-frame in the input stream of video frames;
updating the ngram trie using the accumulated segments;
determining, for each node in the ngram trie, an updated entropy measure.

9. The computer-implemented method of claim 1, further comprising:
upon determining the ngram trie exceeds a specified number of nodes, trimming one or more nodes from the ngram trie, based on the counts,
determining, for each node remaining in the ngram trie, an updated entropy measure.

10. The computer-implemented method of claim 1, further comprising:
combining a first label of the ordered string of labels and a second label of the ordered string of labels to provide;
reorganizing the ngram trie to replace each instance of the first label and the second label with a label representing the combined first and second labels; and
determining, for each node in the ngram trie, an updated entropy measure.

11. The computer-implemented method of claim 1, wherein the plurality of kinematic data vectors generated for foreground objects are generated for one or more foreground objects classified as depicting a common object type.

12. The computer-implemented method of claim 11, wherein the one or more foreground objects are classified based on a plurality of micro features derived from observations of the foreground objects in the input stream of video frames.

13. A computer-readable storage medium containing a program, which when executed on a processor, performs an operation for analyzing a scene depicted in an input stream of video frames captured by a video camera, the operation comprising:
receiving a plurality of sequences, wherein each sequence stores an ordered string of labels assigned to clusters in an adaptive resonance theory (ART) network, wherein the ART network clusters nodes of a self-organizing map (SOM), and wherein the SOM is generated by mapping, to nodes of the SOM, kinematic data vectors generated for foreground objects detected in the input stream of video frames;
generating, from the plurality sequences, an ngram trie to a specified depth, wherein the ngram trie includes a node for each subsequence present in the plurality of sequences, up to the specified depth;
determining, for each node in the ngram trie, an entropy measure based on a count of how many times the subsequence represented by the node appears in the plurality of sequences;
receiving a first sequence; and
determining, in the first sequence, one or more segments, based on the determined entropies.

14. The computer-readable storage medium of claim 13, wherein the operation further comprises, prior to generating the ngram trie, deleting any repeated subsequences in the ordered string of labels in each of the plurality of sequences, up to a specified length.

15. The computer-readable storage medium of claim 13, wherein determining, in the first sequence, one or more segments, comprises:
evaluating subsequences of the first sequence using a sliding window of length (L), wherein an internal entropy expert and a boundary entropy expert each vote a position in each sliding window subsequence at which to split the sliding window sequence; and
inducing a segment boundary at each position in the first sequence that receives at least a number of votes satisfying a vote count threshold (V).

16. The computer-readable storage medium of claim 15, wherein the operation further comprises, determining the sliding window length (L) as $$L = \left\lceil \frac{\mathrm{argmax}(\hat{H}_I) + \mathrm{argmax}(\hat{H}_B)}{2} \right\rceil,$$

wherein $\hat{H}_I$ and $\hat{H}_B$, represent a standardized entropy value for the entropy measure determined for each node in the ngram trie and argmax( ) returns a level of the node in the trie with the greatest entropy values for $\hat{H}_I$ and $\hat{H}_B$.

17. The computer-readable storage medium of claim 15, wherein the vote count threshold (v) is determined as follows $$V = \left\lceil \frac{\sum_{i=1}^{n} \mathrm{argmax}(\hat{H}_I)_i + \mathrm{argmax}(\hat{H}_B)_i}{2n} \right\rceil,$$

wherein $\hat{H}_I$ and $\hat{H}_B$, represent a standardized entropy value for the entropy measure determined for each node in the ngram trie, wherein n represents a total number of branches in the ngram trie and argmax( ) returns a level of the node in the trie with the greatest entropy values for $\hat{H}_I$ and $\hat{H}_B$.

18. The computer-readable storage medium of claim 13, wherein the operation further comprises:
receiving an partial sequence of ART network labels generated from a set of kinematic vectors derived for a foreground object being tracked from frame-to-frame in the input stream of video frames, wherein the set of kinematic vectors are mapped to nodes of the SOM and clustered by the ART network; and
predicting a next element of the partial sequence based on the determined entropies in the ngram trie.

19. The computer-readable storage medium of claim 13, wherein the operation further comprises:
accumulating a threshold number of segments from observations of one or more foreground objects tracked from frame-to-frame in the input stream of video frames;
updating the ngram trie using the accumulated segments;
determining, for each node in the ngram trie, an updated entropy measure.

20. The computer-readable storage medium of claim 13, wherein the operation further comprises:
upon determining the ngram trie exceeds a specified number of nodes, trimming one or more nodes from the ngram trie; and
determining, for each node remaining in the ngram trie, an updated entropy measure.

21. A system, comprising:
a video input source configured to provide an input stream of video frames captured by a video camera, each depicting a scene;
a processor; and
a memory containing a program, which, when executed on the processor is configured to perform an operation for analyzing the scene depicted in the input stream of video frames, the operation comprising:
receiving a plurality of sequences, wherein each sequence stores an ordered string of labels assigned to clusters in an adaptive resonance theory (ART) network, wherein the ART network clusters nodes of a self-organizing map (SOM), and wherein the SOM is generated by mapping, to nodes of the SOM, kinematic data vectors generated for foreground objects detected in the input stream of video frames,
generating, from the plurality sequences, an ngram trie to a specified depth, wherein the ngram trie includes a node for each subsequence present in the plurality of sequences, up to the specified depth,
determining, for each node in the ngram trie, an entropy measure based on a count of how many times the subsequence represented by the node appears in the plurality of sequences,
receiving a first sequence, and
determining, in the first sequence, one or more segments, based on the determined entropies.

22. The system of claim 21, wherein determining, in the first sequence, one or more segments, comprises:
evaluating subsequences of the first sequence using a sliding window of length (L), wherein an internal entropy expert and a boundary entropy expert each vote a position in each sliding window subsequence at which to split the sliding window sequence; and
inducing a segment boundary at each position in the first sequence that receives at least a number of votes satisfying a vote count threshold (V).

23. The system of claim 22, wherein the operation further comprises, determining the sliding window length (L) as $$L = \left\lceil \frac{\text{argmax}(\hat{H}_I) + \text{argmax}(\hat{H}_B)}{2} \right\rceil,$$

wherein $\hat{H}_I$ and $\hat{H}_B$, represent a standardized entropy value for the entropy measure determined for each node in the ngram trie and argmax returns and argmax( ) returns a level of the node in the trie with the greatest entropy values for $\hat{H}_I$ and $\hat{H}_B$.

24. The system of claim 22, wherein the vote count threshold (v) is determined as follows $$V = \left\lceil \frac{\sum_{i=1}^{n} \text{argmax}(\hat{H}_I)_i + \text{argmax}(\hat{H}_B)_i}{2n} \right\rceil,$$

wherein $\hat{H}_I$ and $\hat{H}_B$, represent a standardized entropy value for the entropy measure determined for each node in the ngram trie, wherein n represents a total number of branches in the ngram trie and argmax( ) returns a level of the node in the trie with the greatest entropy values for $\hat{H}_I$ and $\hat{H}_B$.

25. The system of claim 21, wherein the operation further comprises:
receiving an partial sequence of ART network labels generated from a set of kinematic vectors derived for a foreground object being tracked from frame-to-frame in the input stream of video frames, wherein the set of kinematic vectors are mapped to nodes of the SOM and clustered by the ART network; and
predicting a next element of the partial sequence based on the determined entropies in the ngram trie.

* * * * *